United States Patent
Park et al.

(10) Patent No.: US 9,900,477 B2
(45) Date of Patent: Feb. 20, 2018

(54) TERMINAL DEVICE AND METHOD FOR CONTROLLING THEREOF

(71) Applicant: Samsung Electronics Co., Ltd., Suwon-si, Gyeonggi-do (KR)

(72) Inventors: Hyun-cheol Park, Seoul (KR); Woo-jin Park, Yongin-si (KR); Jae-hoon Ko, Suwon-si (KR); Hun-je Yeon, Seoul (KR); Si-jun Lee, Suwon-si (KR); Jin-wook Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 14/140,280

(22) Filed: Dec. 24, 2013

(65) Prior Publication Data

US 2014/0178028 A1 Jun. 26, 2014

(30) Foreign Application Priority Data

Dec. 26, 2012 (KR) .................. 10-2012-0153623
Oct. 16, 2013 (KR) .................. 10-2013-0123373

(51) Int. Cl.
*H04N 5/932* (2006.01)
*H04N 5/935* (2006.01)
(Continued)

(52) U.S. Cl.
CPC ............. *H04N 5/04* (2013.01); *H04L 12/281* (2013.01); *H04L 12/2812* (2013.01);
(Continued)

(58) Field of Classification Search
CPC .......... G06F 3/1454; H04S 3/008; H04N 5/04
(Continued)

(56) References Cited

U.S. PATENT DOCUMENTS 7,539,551 B2   5/2009   Komura et al.
7,987,294 B2   7/2011   Bryce et al.
(Continued)

FOREIGN PATENT DOCUMENTS

CN   102572597 A   7/2012
EP   2 632 066 A1   8/2013
(Continued)

OTHER PUBLICATIONS

Okamura; Foundation and Application of Wireless data communication; Nov. 1, 2011; CQ publishing company. Co., Ltd.

*Primary Examiner* — Hung Dang
*Assistant Examiner* — Girumsew Wendmagegn
(74) *Attorney, Agent, or Firm* — Jefferson IP Law, LLP

(57) ABSTRACT

A terminal device is provided. The terminal device includes a multimedia part configured to play back a content, a communicator configured to perform communication, a short-range wireless communication module configured to share communication connection information with an external device, and when tagged with the external device while a content is played back, a controller configured to control the communicator to be connected to the external device according to the communication connection information and transmit a synchronization signal and the played back content. Accordingly, the terminal device shares a synchronized content with an external device using a User Interface (UI) for controlling a plurality of external devices.

18 Claims, 22 Drawing Sheets

(51) Int. Cl.
  *H04N 5/04* (2006.01)
  *H04W 4/00* (2018.01)
  *H04L 12/28* (2006.01)
  *H04L 29/06* (2006.01)

(52) U.S. Cl.
  CPC ...... *H04L 65/1093* (2013.01); *H04L 65/4084* (2013.01); *H04L 65/80* (2013.01); *H04W 4/008* (2013.01); *H04L 2012/2849* (2013.01)

(58) Field of Classification Search
  USPC ........................................................ 386/201
  See application file for complete search history.

(56) References Cited

U.S. PATENT DOCUMENTS

| | | | |
|---|---|---|---|
| 8,005,421 B2 | 8/2011 | Joo | |
| 8,190,184 B2 | 5/2012 | MacHimura et al. | |
| 8,316,154 B2 | 11/2012 | Yoneda | |
| 8,457,334 B2 | 6/2013 | Yoon et al. | |
| 8,458,291 B2 | 6/2013 | Huh | |
| 9,152,985 B2 | 10/2015 | Wakabayashi | |
| 2003/0023331 A1 | 1/2003 | Komura et al. | |
| 2006/0270395 A1* | 11/2006 | Dhawan et al. | 455/418 |
| 2007/0259615 A1 | 11/2007 | Joo | |
| 2007/0287486 A1 | 12/2007 | Mahcimura et al. | |
| 2008/0162668 A1 | 7/2008 | Miller | |
| 2008/0177822 A1 | 7/2008 | Yoneda | |
| 2008/0209021 A1 | 8/2008 | Shamma | |
| 2008/0242222 A1 | 10/2008 | Bryce et al. | |
| 2010/0130125 A1* | 5/2010 | Nurmi | H04M 1/7253 455/41.1 |
| 2010/0287463 A1 | 11/2010 | Lee | |
| 2011/0150228 A1 | 6/2011 | Yoon et al. | |
| 2012/0060109 A1 | 3/2012 | Han et al. | |
| 2012/0087503 A1* | 4/2012 | Watson et al. | 381/23 |
| 2012/0099594 A1 | 4/2012 | Lau et al. | |
| 2012/0197738 A1 | 8/2012 | Wakabayashi | |
| 2012/0271910 A1 | 10/2012 | Huh | |
| 2012/0303705 A1 | 11/2012 | Park et al. | |
| 2013/0251178 A1 | 9/2013 | Yoon et al. | |
| 2014/0057569 A1* | 2/2014 | Toivanen | H04M 1/7253 455/41.3 |

FOREIGN PATENT DOCUMENTS

| | | |
|---|---|---|
| JP | 2003-047098 A | 2/2003 |
| JP | 2008-268308 A | 11/2006 |
| JP | 2007-293031 A | 11/2007 |
| JP | 2008-160581 A | 7/2008 |
| JP | 2010-507294 A | 3/2010 |
| JP | 2012-160004 A | 8/2012 |
| JP | 2012-249275 A | 12/2012 |
| KR | 10-2005-0017135 A | 2/2005 |
| KR | 10-2007-0107917 A | 11/2007 |
| KR | 10-2009-0125111 A | 12/2009 |
| KR | 10-2011-0072650 A | 6/2011 |
| KR | 10-1046182 B1 | 7/2011 |
| KR | 10-2011-0094628 A | 8/2011 |
| KR | 10-2012-0014340 A | 2/2012 |
| KR | 10-2012-0025929 A | 3/2012 |
| KR | 10-2012-0066051 A | 6/2012 |
| WO | 2010/080854 A2 | 7/2010 |
| WO | 2011/035414 A1 | 3/2011 |
| WO | 2012/145321 A1 | 10/2012 |

* cited by examiner

FIG. 5A

| Select Device | ~11 |
| --- | --- |
| Laptop PC | |
| Mobile A ● | ~13 |
| Mobile B ● | |
| Mobile C ● | |
| Tablet PC | |

FIG. 5B

| Group A | ~15 |
| --- | --- |
| Mobile A | |
| Mobile B | |
| Mobile C | |
| | ~17 |
| Laptop PC | |
| Tablet PC | |

FIG. 6A
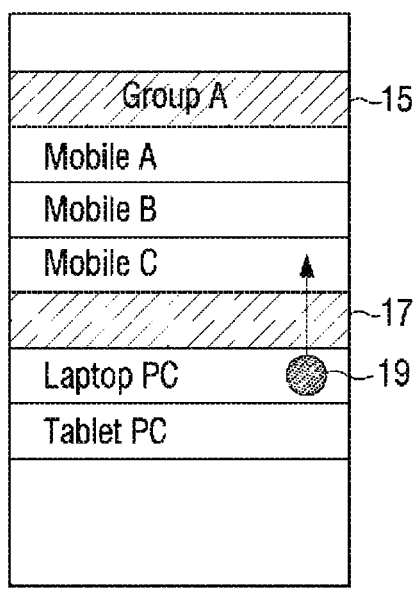
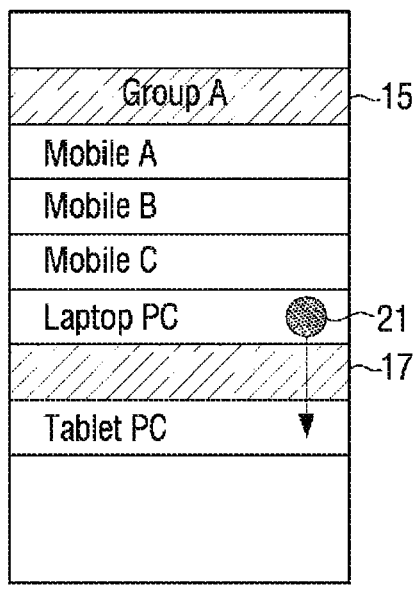
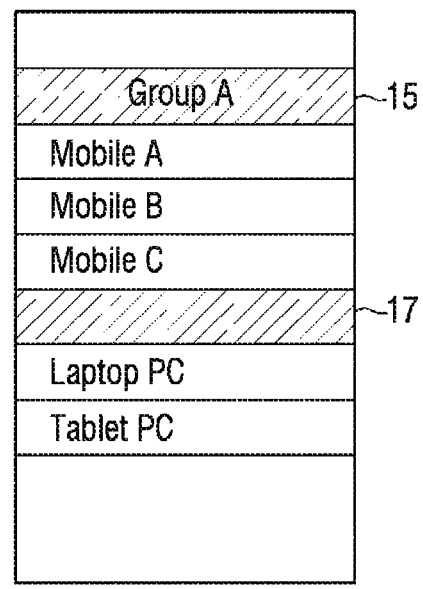
FIG. 6B                FIG. 6C FIG. 8A
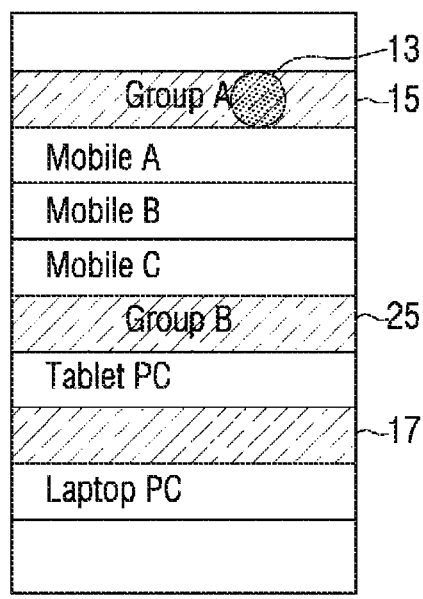
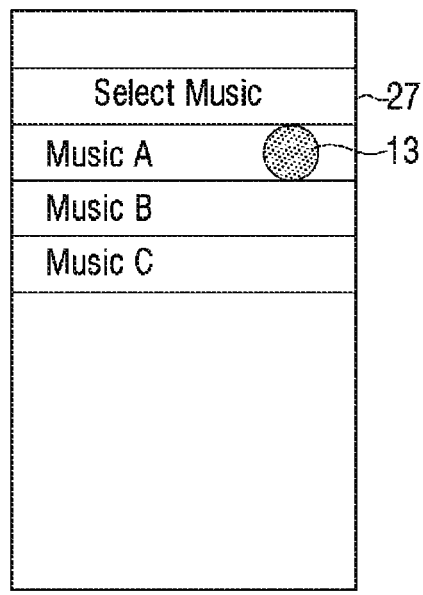 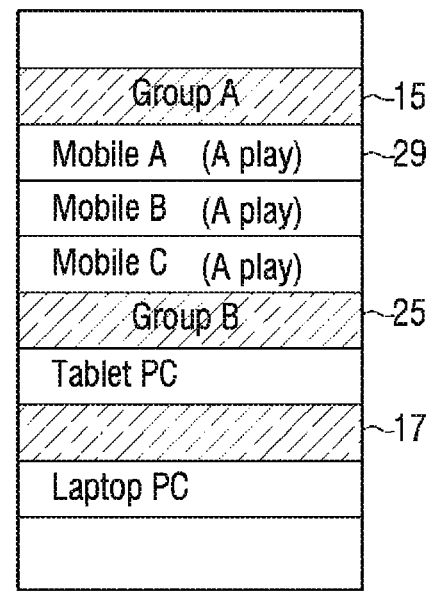
FIG. 8B  FIG. 8C FIG. 9A
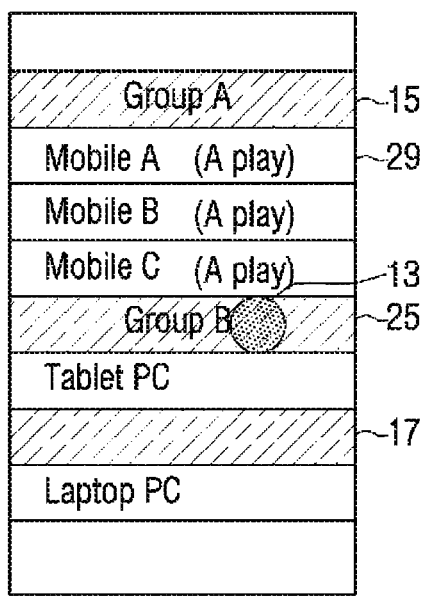
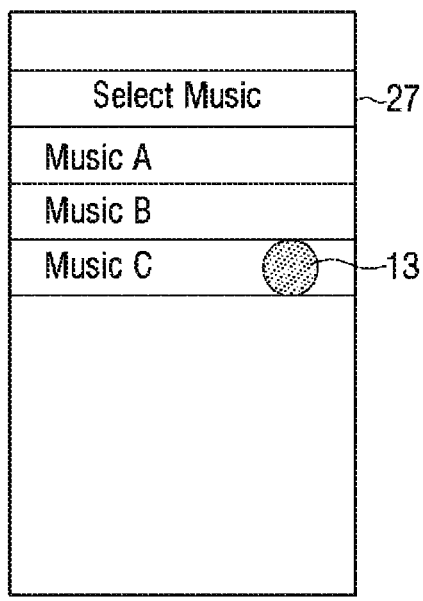 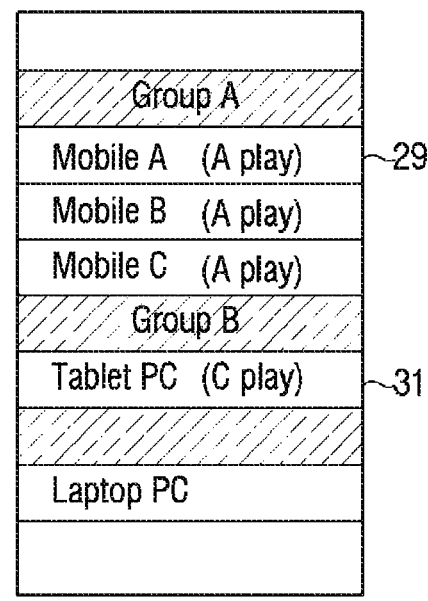
FIG. 9B　　　　FIG. 9C

FIG. 10A

| Select Moving Image | ~33 |
| Movie 1 | ~13 |
| Movie 2 | |
| Movie 3 | |

FIG. 10B

| Set Group | ~35 |
| Laptop PC | |
| Mobile A | ~13 |
| Mobile B | |
| Mobile C | |
| Tablet PC | |

FIG. 10C

| Group A | ~37 |
| Mobile A (Movie 1 play) | ~41 |
| Mobile B (Movie 1 play) | |
| Mobile C (Movie 1 play) | |
| | ~39 |
| Laptop PC | |
| Tablet PC | |

TERMINAL DEVICE AND METHOD FOR CONTROLLING THEREOF

CROSS-REFERENCE TO RELATED APPLICATION(S)

This application claims the benefit under 35 U.S.C. § 119(a) of a Korean patent application filed on Dec. 26, 2012 and assigned Ser. No. 10-2012-0153623 and a Korean patent application filed on Oct. 16, 2013 and assigned Ser. No. 10-2013-0123373, the entire disclosures of both of which are incorporated by reference.

TECHNICAL FIELD

The present disclosure relates to a terminal device and a method for controlling thereof. More particularly, the present disclosure relates to a terminal device which shares a content with devices which can output the content, and a method for controlling thereof.

BACKGROUND

With the development of wireless communication technologies and portable devices, devices are able to be connected with one another wirelessly and many solutions for enabling devices to play back high-capacity media contents wirelessly have been developed. A solution such as Digital Living Network Alliance (DLNA) or Air Play is a representative technique for transmitting a media through the Internet and playing it back.

It is common in the related art that a server acts as a streamer or a controller and a client acts as a player through a 1:1 connection. Therefore, the server is not allowed to be connected with a plurality of clients. The DLNA, which is media sharing technology, allows the server to be connected with long-distance devices and streams a media. The DLNA allows devices to be connected with one another by 1:1 or 1:N, but does not support media synchronization. Also, since a related-art media player has a scenario of a 1:1 connection, a connection with multiple devices, control, and a User Interface (UI)/User experience (US) for a group are not considered.

Therefore, there is a demand for technology for a remote control, a group control, and a control UI, which enables a connection with multiple devices, optimizes synchronization with multiple devices, and performs a real time streaming play service.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a terminal device which can share a synchronized content with a plurality of devices, and a method for controlling thereof.

In accordance with an aspect of the present disclosure, a terminal device is provided. The terminal device includes a multimedia part configured to play back a content, a communicator configured to perform communication, a short-range wireless communication module configured to share communication connection information with an external device, and a controller configured to, when tagged with the external device while a content is played back, control the communicator to be connected to the external device according to the communication connection information and transmit a synchronization signal and the played back content.

The synchronization signal may be a signal to synchronize the external device and content playback time on a real time basis.

The controller, when communication is connected while the content is played back in the multimedia part, may control to transmit a content, from among the contents, which is not played back when the communication is connected to the external device by a streaming method.

The controller, when there are a plurality of contents and external devices respectively, may control to classify and transmit a plurality of contents into a plurality of external devices according to a user's selection.

The device further includes a display configured to display a grouping screen to group the plurality of external devices into a plurality of groups, wherein the controller, when a content to be transmitted on each of the plurality of groups is selected from among the plurality of contents, may control to transmit a selected content and a synchronization signal corresponding to a corresponding content by groups.

The controller, when tagged with a new external device, may display the grouping screen on the display, when one of the plurality of groups displayed on the grouping screen is selected, include the tagged new external device in the selected group.

The controller may control to display a group control screen including a control menu to adjust an output state of the content on the display.

The controller, when an adjustment command for one of the plurality of groups is input, may transmit the adjustment command to an external device belonging to the one group respectively, and simultaneously adjust a content output state of all the external devices.

In accordance with another aspect of the present disclosure, a terminal device is provided. The terminal device includes a multimedia part configured to play back a content, a communicator configured to perform communication, a short-range wireless communication module configured to share communication connection information with an external device, and a controller configured to, when tagged with the external device while a content is played back, control the communicator to be connected to the external device according to the communication connection information, wherein the controller processes the preset channel sound from among a plurality of channel sounds composing a synchronization signal and an audio signal of the content to be output in the tagged external device.

The controller may control to classify the audio signal into the plurality of channels sounds and transmit the preset channel sound from among the classified plurality of channel sounds to the external device.

The controller may control to transmit channel sound information which designates channel sound to be output in the external device from among a plurality of channel sounds composed of an audio signal of the content, and the audio signal to the external apparatus so that each of the plurality of channel sounds is output in a corresponding device.

Meanwhile, the plurality of channel sounds may include at least one of a front left channel sound, a front right channel sound, a rear left channel sound, a rear channel sound, a center channel sound, and a low frequency effects channel sound.

In accordance with another aspect of the present disclosure, a method for controlling of a terminal device is provided. The method includes playing back a content, when tagged with an external device while a content is played back, sharing communication connection information and connecting with the external device, and transmitting a synchronization signal and the played back content.

The synchronization signal may be a signal to synchronize the external device and content playback time on a real time basis.

The transmitting, when communication is connected while the content is played back, may include transmitting a content, from among the contents, which is not played back from when the communication is connected, to the external device by a streaming method.

The transmitting, when there are a plurality of contents and the external devices respectively, may include classifying and transmitting a plurality of contents into a plurality of external devices according to a user's selection.

The method further includes displaying a grouping screen to group the plurality of external devices into a plurality of groups, wherein the transmitting, when a content to be transmitted on each of the plurality of groups is selected from among the plurality of contents, comprises transmitting a selected content and a synchronization signal corresponding to a corresponding content by groups.

The method may further include, when tagged with a new external device, displaying the grouping screen, and when one of the plurality of groups displayed on the grouping screen is selected, including the tagged new external device in the selected group.

The method may further include displaying a group control screen including a control menu to adjust an output state of the content.

The method further includes, when an adjustment command for one of the plurality of groups is input, transmitting the adjustment command to an external device belonging to the one group and simultaneously adjusting a content output state of all the external devices.

In accordance with another aspect of the present disclosure, a method for playing back of a content is provided. The method includes, when tagged with an external device while a content is played back, sharing communication connection information and connecting with the external device, and processing and transmitting the preset channel sound from among a plurality of channel sounds composing a synchronization signal and an audio signal of the content to be output in the tagged external device.

The transmitting may include classifying the audio signal into the plurality of channel sounds and transmitting classified channel sounds to a corresponding external device.

The transmitting may include transmitting sound information which designates channel sound to be output in the external device from among a plurality of channel sounds composing an audio signal of the content and the audio signal to the external device, and enabling each of the plurality of channel sounds to be output in a corresponding device.

The plurality of channel sounds include at least one of a front left channel sound, a front right channel sound, a rear left channel sound, a rear right channel sound, a center channel sound, and a low frequency effects channel sound.

According to various embodiments as described above, the terminal device may optimize synchronization with multiple devices and may perform a real time streaming playback service using a control User Interface (UI).

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description take in conjunction with the accompanying drawings, in which:

FIGS. 5A, 5B, 6A, 6B, 6C, 7A, 7B, 8A, 8B, 8C, 9A, 9B, 9C, 10A, 10B, 10C, 11A, 11B, and 11C are views to explain a group management screen according to various embodiments of the present disclosure;

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
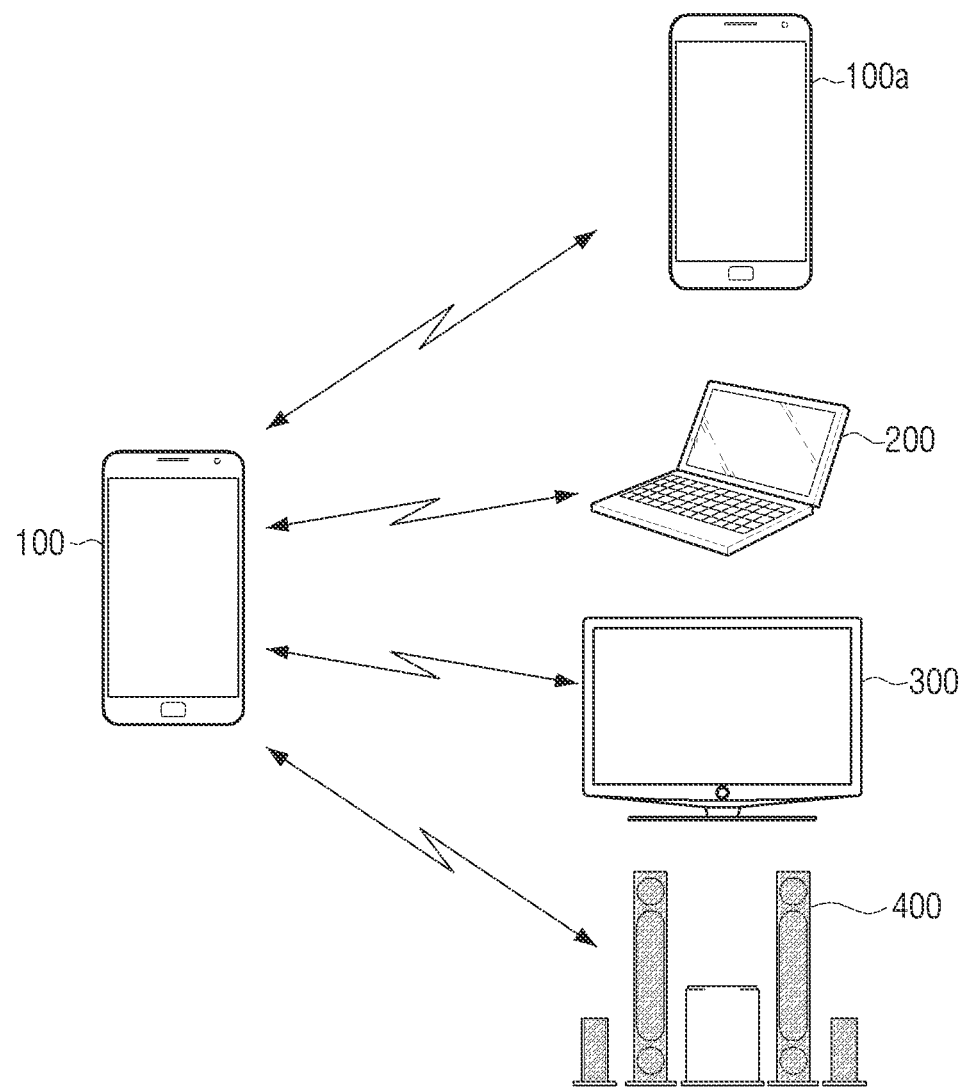
FIG. 1 is a view illustrating external devices which share a content according to an embodiment of the present disclosure.

FIG. 1 is a view to explain external devices which share a content with one another according to an embodiment of the present disclosure.

Referring to FIG. 1, a terminal device 100 may be connected with a plurality of devices. For example, the terminal device 100 or external devices may be a mobile phone 100a, a notebook Personal Computer (PC) 200, a tablet PC 300, and a speaker 400. Also, the terminal device 100 or external devices may be various kinds of devices that include a function of receiving and playing back contents, such as an electronic album, a desktop PC, a Personal Digital Assistant (PDA), a digital audio player, a navigation system, and a monitor.

A user selects a content to share in the terminal device 100 and selects an external device to share the content. The user may select a plurality of external devices. After that, when a content sharing function is selected on the terminal device 100, the terminal device 100 transmits the selected content to the selected external device. The content sharing function recited herein refers to a function that shares a content among a plurality of devices and plays it back. Specifically, the content sharing function may use Digital Living Network Alliance (DLNA).

In performing the content sharing function, the terminal device 100 may act as a Digital Multimedia Server (DMS) to provide a content. The external device may act as a Digital Multimedia Renderer (DMR) or a Digital Multimedia Player (DMP) to play back the content provided from the terminal device 100. The terminal device 100 may transmit a synchronization (sync) signal to the external device along with the content. Accordingly, the external device synchronizes the received content and plays it back. That is, the synchronization signal is a signal to synchronize the external device with the content playback time on a real time basis. A User Interface (UI) of the terminal device 100 and a synchronizing process will be explained in detail below. Hereinafter, a configuration of the terminal device 100 will be explained.

Figure 2A:
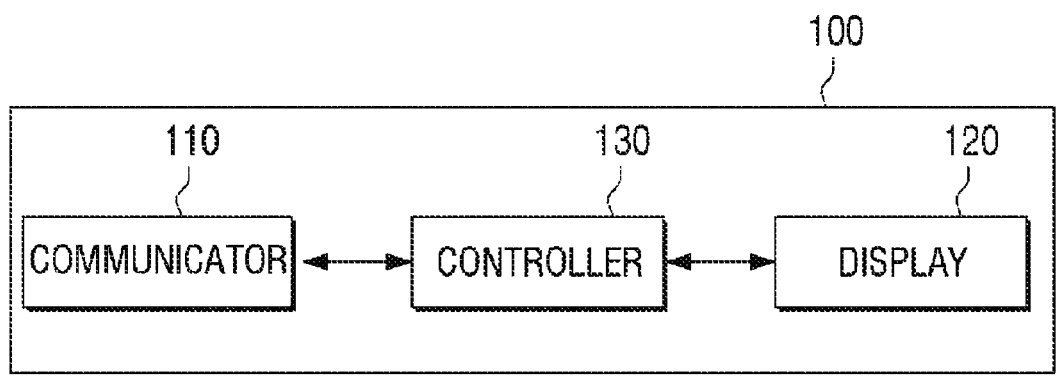
FIGS. 2A and 2B are block diagrams illustrating a terminal device according to an embodiment of the present disclosure.
Figure 2B:
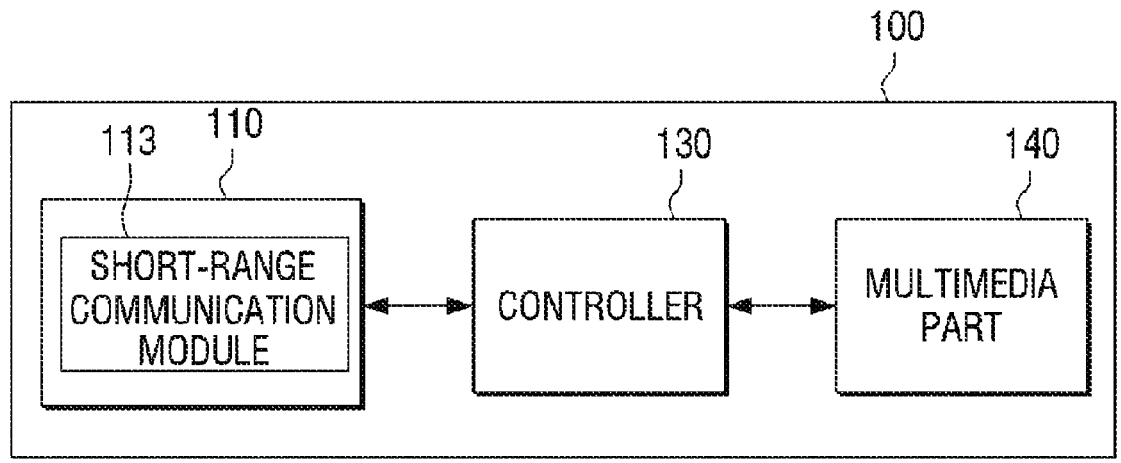

FIGS. 2A and 2B are block diagrams illustrating a terminal device according to an embodiment of the present disclosure.

Referring to FIG. 2A, the terminal device 100 includes a communicator 110, a display 120, and a controller 130. FIG. 2A is a block diagram illustrating a configuration of the terminal device 100 when the terminal device 100 serves to transmit a content.

An inputter (not shown) receives a content sharing command. When the inputter receives the content sharing command, the terminal device 100 may display a content selection screen and an external device selection screen through the display 120.

When the content sharing command is input by the user, the communicator 110 communicates with the external device to receive connection information and a content transmission request from the external device. The communicator 110 transmits a sync signal for synchronizing playback to the selected external device, and transmits the selected content to the external device. According to an embodiment of the present disclosure, the communicator 110 may include a short-range communication module. In this case, when a new external device including a short-range communication module is tagged in the terminal device 100, the terminal device 100 receives connection information and establishes communication with the new external device. The terminal device 100 may transmit a content which is being played back to the new external device using the established communication method. A process of transmitting a content using a short-range communication module will be explained further below. Also, when the terminal device 100 receives a content sharing command while playing back a content, the communicator 110 communicates with the new external device. After that, the terminal device 100 may transmit the content which is being played back to the new external device. For example, the communication may be performed in various communication methods such as Bluetooth, Zigbee, and Wireless Fidelity (WI-FI).

The display 120 displays the external devices that are communicable with the communicator 110, and displays a grouping screen to group found external devices according to a user's command, and a content selection screen. Also, the display 120 may display a group management screen or a group control screen.

For example, the display 120 may be implemented by using various displays such as a Liquid Crystal Display Panel (LCD panel), a Plasma Display Panel (PDP), an Organic Light Emitting Diode (OLED), a Vacuum Fluorescent Display (VFD), a Field Emission Display (FED), and an Electro Luminescence Display (ELD). The display 120 may be implemented by using a general display panel without a touch input function, or may be implemented by using a touch display panel that can recognize user manipulation using a proximity sensor or a touch sensor. When the display 120 is implemented by using a touch display panel, the display 120 may receive at least one touch gesture through a user's body (for example, user's fingers including the thumb) or an inputting means which can be sensed (for example, a stylus pen).

When found external devices are grouped into at least one group on the grouping screen, the controller 130 transmits the content to be shared to all of the external devices belonging to the group selected by the user at the same time. At this time, the controller 130 may synchronize content playback operations of the external devices and control the playback operations. That is, the controller 130 may control to group the external devices which are accessible into a plurality of groups, control to select a content for each group, and transmit the content to each group. At this time, the controller 130 may control to perform a content playback operation which is synchronized in each group. Also, when a new external device is connected with the terminal device 100 while the terminal device 100 is playing back a content, the controller 130 may transmit the content to the new external device. The controller 130 may control the new external device to synchronize the received content and play it back.

Also, when a control command on a content is input, the controller 130 transmits an adjustment command to adjust an output state of the content to each external device according to the control command. For example, while at least one external device belonging to a first group is playing back a content, a command to pause playback of the content by the first group may be input by the user. The controller 130 may transmit the control command to pause the playback of the content by the first group to the external device belonging to the first group. Also, when a request for transmission of a content is input from a new external device, the controller 130 may perform authentication and may transmit a selected content. For example, the content transmission request of the new external device may be transmitted using a short-range communication module. A detailed process will be explained below.

As described above, the terminal device 100 enables the plurality of external devices to play back a synchronized content using the functions performed by the above-described configuration.

Referring to FIG. 2B, the terminal device 100 includes a communicator 110, a short-range communication module 113, a controller 130, and a multimedia part 140. The terminal device 100 may include the same configuration parts and perform operations of a receiver terminal or operations of a transmitter terminal.

The communicator 110 may include the short-range communication module 113. The short-range communication module 113 of the receiver terminal device 100 reads out connection information when a short-range communication module of a terminal device which transmits a content is tagged in the short-range communication module 113. The communicator 110 is connected with the terminal device which transmits the content based on the read-out connection information, and communicates with the terminal device. Also, the communicator 110 receives information for synchronizing and the content from the terminal device which transmits the content. That is, the short-range wireless communication module of the terminal device 100 which transmits a content, when tagged with the external device, shares communication connection information with the external device. The short-range communication module 113 may transmit connection information to the short-range communication module of the external device. The communicator 110 shares communication connection information with the external device and transmits the synchronization signal and the played back content to the external device. For example, the synchronization signal and the content can be transmitted according to a wireless specification (e.g., Institute of Electrical and Electronics Engineers (IEEE) 802.11x) such as Wi-Fi and Bluetooth.

The above is an embodiment, and when tagged with the external device, the short-range communication module 113 of the transmitter terminal device 100 can read connection information from the external device and establish communication.

When the terminal device which transmits the content is tagged, the controller 130 automatically converts a mode into a content sharing mode and controls the communicator 110 to access the terminal device which transmits the content based on the connection information and to receive the content which is being played back by the terminal device which transmits the content. The controller 130 may control each element of the terminal device 100 to synchronize the received content and play it back.

Also, the terminal device 100 can make each of the plurality of channel sound signals composing the audio signal of the content be output in the corresponding external device. For example, the controller 130 may control to classify the audio signal of the content into the plurality of channel sounds and transmit each of the classified channel sounds to the corresponding external device along with the synchronization signal.

Alternatively, the controller 130 may generate channel sound information which designates channel sound to be output in a certain external device according to a user's selection. For example, the channel sound can be one of a front left channel sound, a front right channel sound, a rear left channel sound, a rear right channel sound, a center channel sound, and a low frequency effects channel sound. The channel sound information can be information that can show which channel sound is output from among the plurality of channel sounds. The controller 130 may transmit the audio signal, the synchronization signal, and generated channel sound information of the content to a certain external device. The certain external device, by using the received channel sound information, may separate a channel sound from the audio signal of the received content and output separated channel sound by using the received synchronization signal. The multimedia part 140 is synchronized with a content playback operation of the terminal device which transmits the content, and plays back the received content. Hereinafter, a method for synchronizing will be explained with reference to a block diagram for content synchronization.

Figure 3:
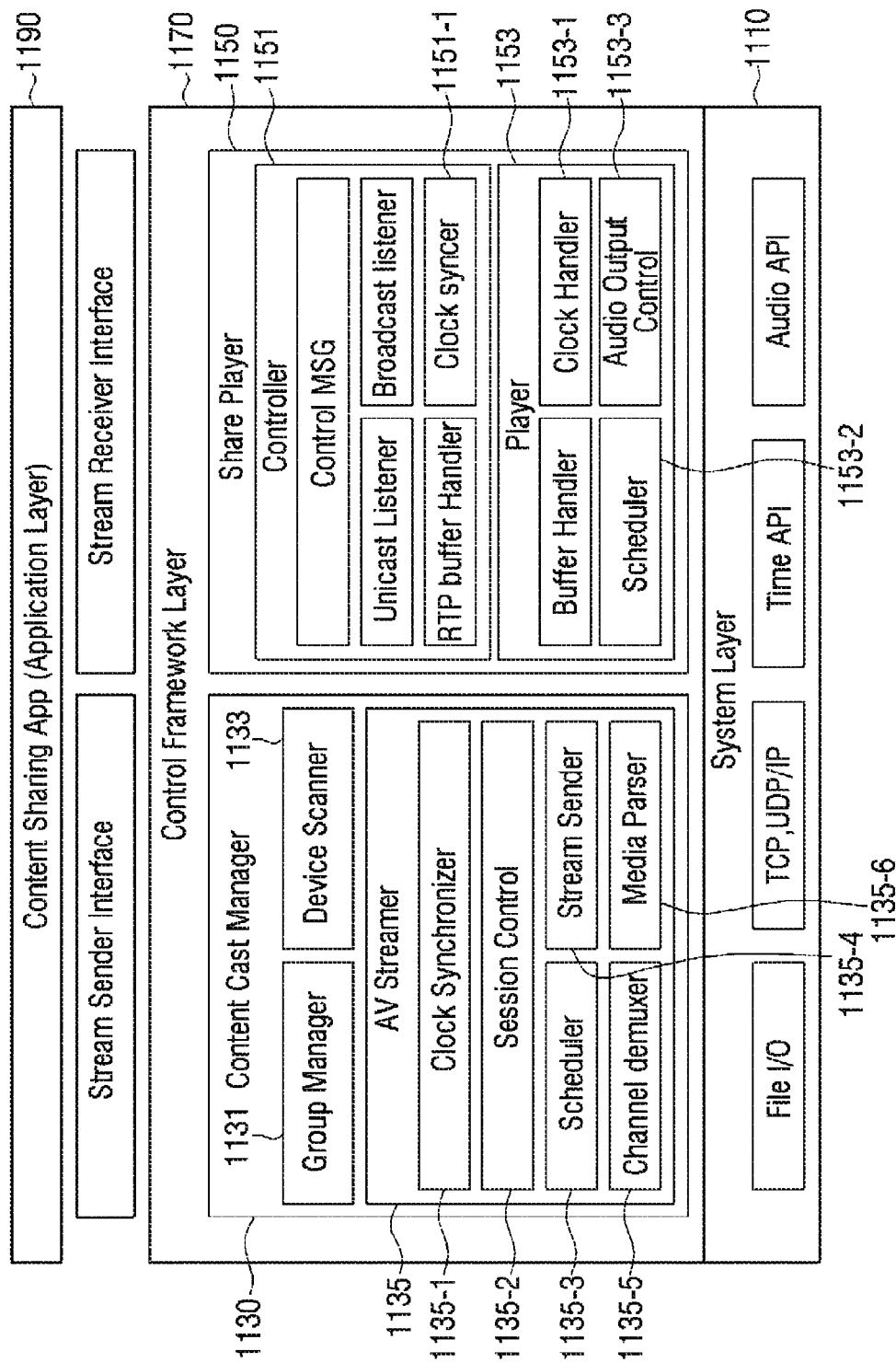
FIG. 3 is a block diagram to explain content synchronization according to an embodiment of the present disclosure.

FIG. 3 is a block diagram for content synchronization according to an embodiment of the present disclosure.

Referring to FIG. 3, a system layer 1110, a control framework layer 1170, and an application layer 1190 in which a content sharing application is performed, are included. The control framework layer 1170 includes a content cast manager 1130 in the terminal device 100 which transmits a content. The control framework layer 1170 includes a share player 1150 in the external device which receives and plays back a content.

The system layer 1110 includes a file Input/Output (I/O) module, a Transmission Control Protocol (TCP), a User Datagram Protocol/Internet Protocol (UDP/IP) module, a time Application Programming Interface (API) module, and an Audio/Video (A/V) module. Each module of the system layer 1110 is a general element and thus an explanation thereof is omitted herein.

The content cast manager 1130, which corresponds to the control framework layer of the terminal device 100 which transmits the content, includes a group manager module 1131, a device scanner module 1133, and an AV streamer module 1135. The group manager module 1131 manages scanned external devices as a group and stores or loads the configured group. Also, the group manager module 1131 manages a channel mode and a group attribute. The device scanner module 1133 scans external devices. At this time, the device scanner module 1133 uses a predetermined multicast address for a content sharing service. The AV streamer module 1135 includes a clock synchronizer module 1135-1, a session control module 1135-2, a scheduler module 1135-3, a stream sender module 1135-4, a channel demuxer module 1135-5, and a media parser module 1135-6.

In order to play back a synchronized content, external devices should be clock-synchronized with one another. The clock synchronizer module 1135-1 transmits a clock synchronization packet for clock-synchronizing the external devices to the external devices. The session control module 1135-2 performs a content setting task to play back a content with an external device. The session control module 1135-2 may use a Real Time Publish Subscribe (RTPS) protocol. The scheduler module 1135-3 schedules content stream transmission. The scheduler module 1135-3 may use a UDP. The stream sender module 1135-4 transmits a content stream. The channel demuxer module 1135-5 demuxes a channel to transmit a content and transmits the content to a necessary channel. The media parser module 1135-6 parses a signal row of a content, checks an error, and makes an object that is accessible by an external device.

The share player 1150, which corresponds to the control framework layer of the external device which receives the content, includes a control module 1151 and a playback module 1153. The control module 1151 processes a packet transmitted from the terminal device 100, and controls and manages clock synchronization, session control, and transmission stream. The control module 1151 includes a clock synchronizer module 1151-1. The clock synchronizer module 1151-1 receives and processes a clock synchronization packet of the terminal device 100. The playback module 1153 includes a clock handler module 1153-1, a scheduler module 1153-2, and an A/V output control module 1153-3. The clock handler module 1153-1 requests a synchronization time for synchronizing and playing back a transmitted content, detects an error between the synchronization time and a reception time of a received sync signal, and adjusts the synchronization time. The scheduler module 1153-2 schedules an output time with reference to the synchronized clock. The A/V output control module 1153-3 controls output of the external device to synchronize the content. A process of synchronizing and playing back a content according to an embodiment will be explained below.

The terminal device 100 selects a synchronization reference reception device from among the plurality of external devices, transmits information on the synchronization reference reception device to the other external devices, and transmits a sync signal packet to the external devices at predetermined time intervals. The external device records a reception time of the received packet, receives sync signal reception time information from the synchronization reference reception device, and calculates a sync signal reception time error. When the calculated error has a negative number value, the external device performs a certain operation earlier than the synchronization reference reception device as much as the error. If the calculated error is a positive number value, the external device performs a certain operation later than the synchronization reference reception device as much as the error. Accordingly, the plurality of external devices are synchronized with one another and play back the content.

Figure 4:
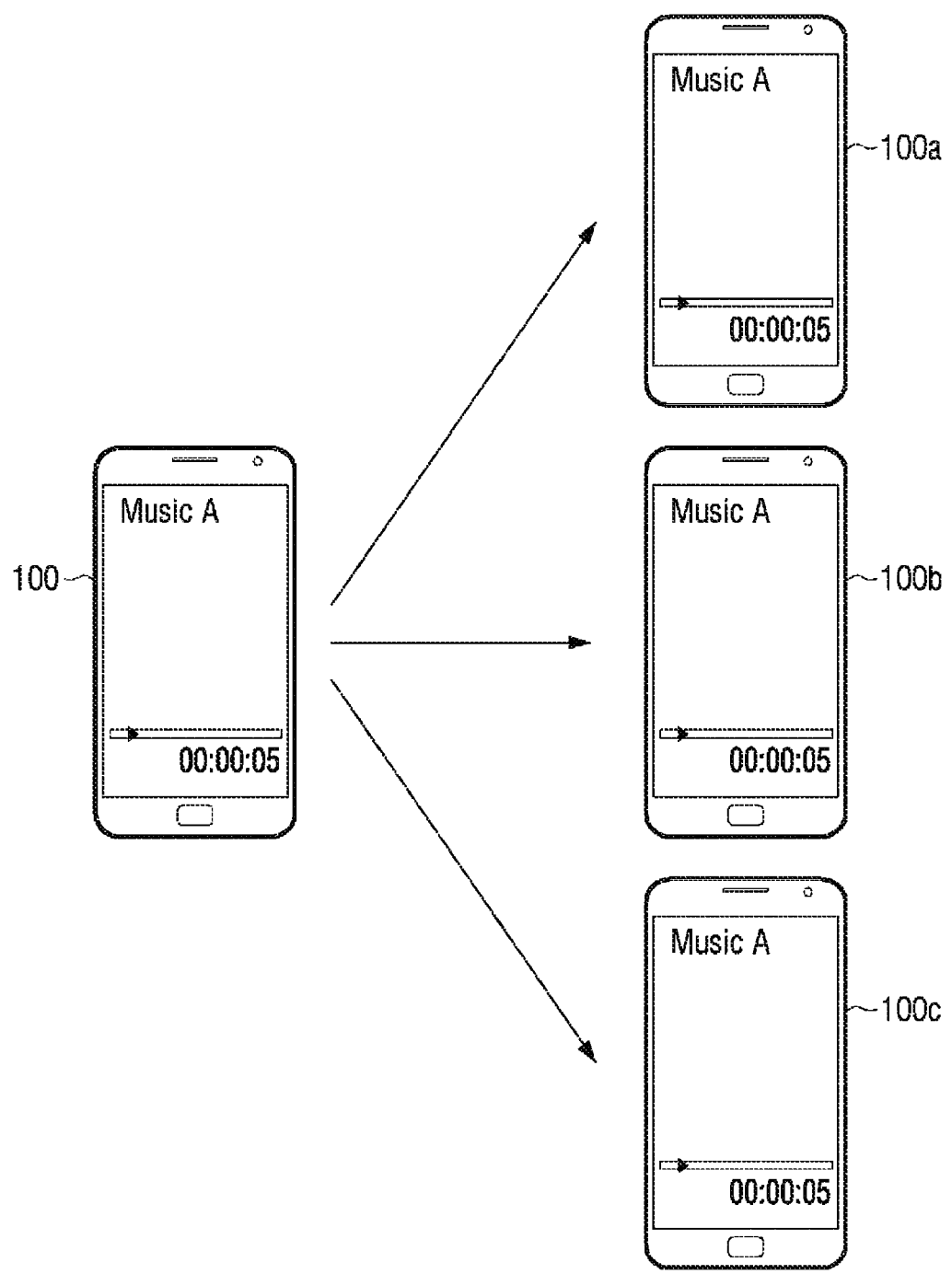
FIG. 4 is a view to explain media playback by a plurality of terminal devices according to an embodiment of the present disclosure.

FIG. 4 is a view to explain media playback by a plurality of terminal devices according to an embodiment of the present disclosure. Referring to FIG. 4, one terminal device 100 serves as a transmitter and the other terminal devices 100a, 100b, and 100c serve as receivers.

The transmitter terminal device 100 receives a content sharing command from the user, and receives a group setting command and a content selecting command. In FIG. 4, first to third receiver terminal devices 100a, 110b, and 100c are set as one group, and a music A is selected as a content to be played back. When the transmitter terminal device 100 receives a content playback command from the user, the transmitter terminal device 100 plays back the music A. At the same time, the transmitter terminal device 100 transmits a content stream of the music A to the first to third receiver terminal devices 100a, 100b, and 100c. When the first to third receiver terminal devices 100a, 100b, and 100c receive the content stream of the music A from the transmitter terminal device 100, they automatically play back the music A. The transmitter terminal device 100 and the first to third receiver terminal devices 100a, 100b, and 100c synchronize the music A and play it back. That is, as shown in FIG. 4, when the transmitter terminal device 100 plays back the music A from a 5-second point, the first to third receiver terminal devices 100a, 100b, and 100c play back the music A from the 5-second point.

The music A may be a content that is stored in the transmitter terminal device 100 or a content that is received at the transmitter terminal device 100 from a server. That is, the transmitter terminal device 100 may transmit the stored content to the first to third receiver terminal devices 100a, 100b, and 100c on a real time basis. Also, the transmitter terminal device 100 may receive a content from a server and may transmit the content to the first to third receiver terminal devices 100a, 100b, and 100c on a real time basis. When the transmitter terminal device 100 receives the content from the server and transmits the content on a real time basis, the transmitter terminal device 100 may perform a buffering process to stably play back the content. Accordingly, the content may be received and played back by the first to third receiver terminal devices 100a, 100b, and 100c regardless of whether the content is stored in the first to third receiver terminal devices 100a, 100b, and 100c.

The transmitter terminal device 100 may transmit the content which is being played back to the first to third terminal devices 100a, 100b, and 100c while playing back the content. In this case, the first to third terminal devices 100a, 100b, and 100c may be synchronized with the time at which the transmitter terminal device 100 plays back the content and may play back the received content.

The UI illustrated in FIG. 4 is merely one embodiment. The transmitter terminal device 100 may display a UI showing playback-related information as shown in FIG. 4. In the case of a music content, the transmitter terminal device 100 may not display a UI and may play back only the music.

It is necessary to set a group and select a content in order for transmitter and receiver terminal devices to synchronize and play back a content. Regarding the setting of the group and the selecting of the content, a UI/UX may be configured in various ways. Hereinafter, a group management screen and a group control screen according to an embodiment will be explained.

Various Embodiments of Group Management Screen

FIGS. 5A and 5B are views to explain a method for selecting an external device and setting a group according to an embodiment of the present disclosure.

Referring to FIG. 5A, there exists a laptop PC, a mobile A, a mobile B, a mobile C, and a tablet PC that can share a content. When a content sharing command is input by the user, the terminal device 100 displays a device selection screen 11. The device selection screen 11 includes external devices that can share a content. In FIG. 5A, the mobile A, the mobile B, and the mobile C are selected by touch input 13. When selection is completed, the selected mobile A, mobile B, and mobile C are set as one group.

Referring to FIG. 5B, the mobile A, the mobile B, and the mobile C are set as a group A 15. Since the laptop PC and the tablet PC are not selected, they are displayed separately from the group A 15. In FIG. 5B, a non-group setting region 17 refers to a region that displays a device that is not selected for the group distinctly from a device that belongs to the group. For another example, the non-group setting region 17 displays a text such as "Group is not set" to display devices that do not belong to the group. A screen through which the user sets and edits a group and which distinguishes external devices belonging to the group from the other devices is a group management screen. Names such as 'Mobile A' and 'Laptop PC', which distinguish external devices on the group management screen, are identification information of external devices. The identification information may be a unique IDentifier (ID) of each external device or may be a product name or a unique number. Devices displayed on the screen may be included in or excluded from the group in a different way.

FIGS. 6A, 6B, and 6C are views illustrating a method for including a device in a group or excluding a device from a group according to an embodiment of the present disclosure.

Referring to FIG. 6A, a mobile A, a mobile B, and a mobile C are included in a group A 15. A non-group setting region 17 displays a device that does not belong to the group and a laptop PC and a tablet PC exist in the non-group setting region 17. The laptop PC is moved from the non-group setting region 17 to the group A 15 by touch and drag input 19.

Referring to FIG. 6B, the laptop PC may be included in the group A 15 by the touch and drag input 19. In this state, the user may exclude a device that is included in the group A 15 from the group A 15. The laptop PC is moved to the non-group setting region 17 by touch and drag input 21.

Referring to FIG. 6C, the laptop PC is excluded from the group A 15 and is moved to the non-group setting region 17 by the touch and drag input 21. Accordingly, the mobile A, the mobile B, and the mobile C are included in the group A 15 and the laptop PC and the tablet PC are included in the non-group setting region 17.

The method for setting a single group and adding an external device to the set group or excluding a device from the group has been described so far. The terminal device 100 may set a plurality of groups.

Figure 7A:
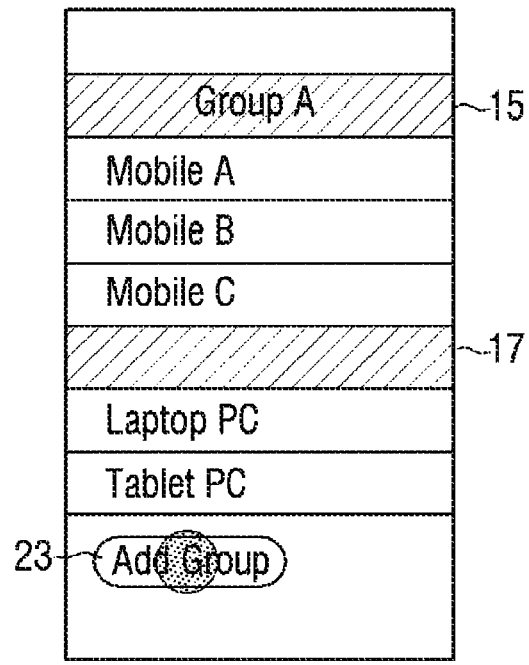
Figure 7B:
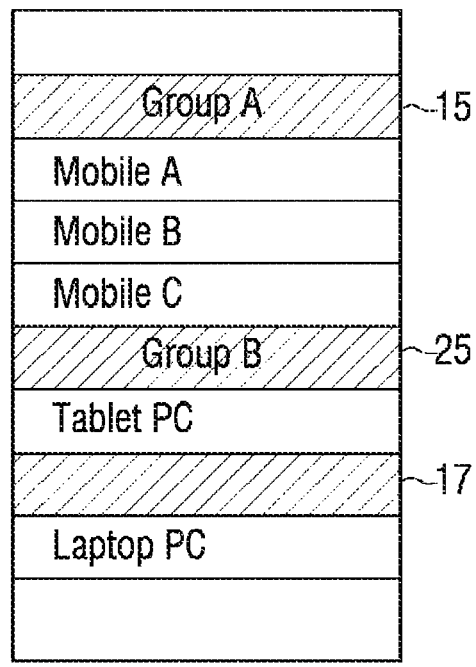

FIGS. 7A and 7B are views to explain a method for setting a plurality of groups according to an embodiment of the present disclosure. The terminal device 100, when there are a plurality of contents and external devices respectively, may classify the plurality of the contents into a plurality of external devices according to a user's selection.

Referring to FIG. 7A, a mobile A, a mobile B, and a mobile C are included in a group A 15, and a laptop PC and a tablet PC are included in a non-group setting region 17. A group addition item 23 may be displayed under the non-group setting region 17. The screen illustrated in FIG. 7B is an example and at least one of various items such as a group deletion item, a group editing item, and a canceling item may be displayed in addition to the group addition item 23. Also, the menu item may not be usually displayed and may be displayed using a proximity sensor when a user object (for example, a finger or a pen) approaches.

As shown in FIG. 7A, the group addition item 23 may be selected by user's touch input. The terminal device 100 may display the device selection window 11 as shown in FIG. 5A in response to the selected group addition item 23. Since only the group A 15 is generated in FIG. 7A, a group B may be automatically generated as a next group. Also, the terminal device 100 may additionally display a window through which a group name is input. The process of adding a device to a group has been described above in FIGS. 6A, 6B, and 6C and thus an explanation thereof is omitted.

Referring to FIG. 7B, the user selects the tablet PC for the group B. Accordingly, the group A 15 includes the mobile A, the mobile B, and the mobile C, and the group B 25 includes the tablet PC. The laptop PC that does not belong to any group is included in the non-group setting region 17. As described above, the terminal device 100 may set the plurality of groups including at least one external device. Hereinafter, a process of selecting a group and sharing a content will be explained.

FIGS. 8A, 8B and 8C are views to explain a process of sharing a content according to an embodiment of the present disclosure.

Referring to FIG. 8A, a group management screen displays a group A 15, a group B 25, and a non-group setting region 17. The group A is selected by a touch input 13.

Referring to FIG. 8B, the group management screen of the terminal device 100 is converted into a music selection screen 27 while the group A 15 is selected. The music selection screen 27 displays pieces of music that are stored in the terminal device 100 and can be shared. In FIG. 8B, music A, music B, and music C are displayed. The music A is selected by user's touch input 13.

Referring to FIG. 8C, when the music A is selected, the terminal device 100 transmits content streaming of the music A to the mobile A, the mobile B, and the mobile C which are included in the group A 15, and the mobile A, the mobile B, and the mobile C synchronize the music A and play it back. The terminal device 100 may synchronize the music A simultaneously and play it back. The terminal device 100 shown in FIG. 8C converts the music selection screen 27 into the group management screen when the music A is selected. The group management screen may display state information 29 indicating that the mobile A, the mobile B, and the mobile C are playing back the music A. That is, a text "Music A play" may be displayed on a side of each of the mobile A, B, and C. Such state information 29 may be displayed in a different way. That is, the state information 29 may be displayed by displaying an item of the external device which is playing back the content in a specific color. Alternatively, the state information 29 may be displayed by changing a font of a name of the external device which is playing back the content, or changing a color or adjusting brightness periodically.

Referring to FIG. 8C, the screen of the terminal device 100 is converted into the group management screen 29 when the content is selected. However, a content playback screen may be displayed. In this case, the display screen of the terminal device 100 may be converted into the group management screen 29 using a group management screen conversion item.

The terminal device 100 may transmit different contents to a plurality of groups and may play back the contents.

FIGS. 9A, 9B, and 9C are views to explain a method for sharing different contents with a plurality of groups according to an embodiment of the present disclosure.

Referring to FIG. 9A, a group management screen displays a group A 15, a group B 25, and a non-group setting region 17. External devices included in the group A 15 is playing back music A. The user may select the group B 25 using touch input 13. When the group B 25 is selected by the touch input 13, the display screen of the terminal device 100 is converted into a music selection screen 27.

Referring to FIG. 9B, the music selection screen 27 displayed on the terminal device 100 is illustrated. The music selection screen 27 displays a list of pieces of music that can be shared. The user selects music C using the touch input 13.

Referring to FIG. 9C, the terminal device 100 displays state information 29 indicating that the external devices included in the group A 15 are playing back the music A. Also, the terminal device 100 displays state information 31 indicating that an external device included in the group B 25 is playing back the music C. As explained above in FIG. 8C, the state information 31 may be displayed in various ways, such as coloring or changing color, font, or brightness. Also, the terminal device 100 may display the content which is being played back without converting the display screen into the group management screen. When the terminal device 100 transmits the plurality of contents to the plurality of groups, the terminal device may continue playing back the content that was initially played back.

As illustrated in FIGS. 8A to 9C, the terminal device 100 may set a plurality of groups and transmit an independent content and perform synchronization playback by groups. That is, the display 120 can display a grouping screen to group a plurality of external devices into a plurality of groups. The terminal device 100, when a content to be transmitted on each of the plurality of groups is selected from among the plurality of contents, may transmit a selected content and a synchronization signal corresponding to a corresponding content by groups.

In this case, when tagged with a new external device, the terminal device 100 can display the grouping screen. Upon a user's command, when one of the plurality of groups displayed on the grouping screen is selected, the terminal device 100 can include the tagged new external device in the selected group.

Referring to FIGS. 5A to 9C, a group is set first and then a content is selected. According to another embodiment of the present disclosure, the terminal device 100 may select a content first and then sets a group to share the content.

FIGS. 10A, 10B, and 10C are views to explain a method for selecting a moving image content and setting a group according to an embodiment of the present disclosure.

Referring to FIG. 10A, when a content sharing command is input, the terminal device 100 displays a moving image selection screen 33. The moving image selection screen 33 displays a list of moving images that can be shared. The user selects a movie 1 using touch input 13.

Referring to FIG. 10B, when the movie 1 is selected, the terminal device 100 converts the moving image selections screen 33 into a group setting screen 35. The group setting screen 35 displays a list of external devices that can share the content. In FIG. 10B, a laptop PC, a mobile A, a mobile B, a mobile C, and a tablet PC are displayed. The mobile A, the mobile B, and the mobile C are selected by user' touch input 13.

Referring to FIG. 10C, when external devices to be included in a group are selected, the terminal device 100 converts the group setting screen 35 into a group management screen. The group management screen displays a group A 37 which includes the mobile A, the mobile B, and the mobile C, and a non-group setting region 39 which includes the laptop PC and the tablet PCT. The group management screen may display state information 41 indicating that the external devices included in the group A 37 are playing back the movie 1. As described above, the state information may be displayed in various ways. Also, when the content is selected and the group is set, the terminal device 100 may display a content playback screen.

A variety of state information may be displayed according to playback, pause, or whether the device is included in another group.

Figure 11A:
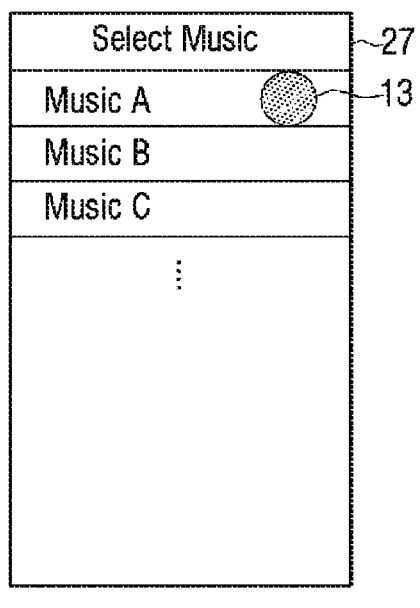
Figure 11B:
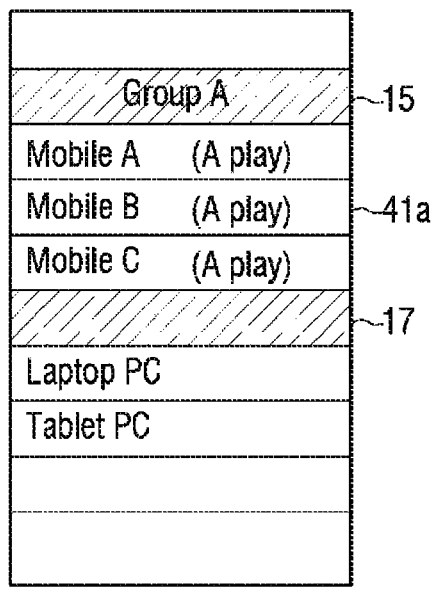
Figure 11C:
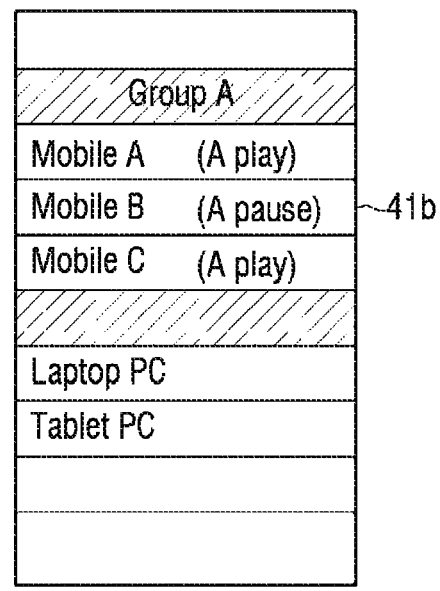

FIGS. 11A, 11B, and 11C are views to explain a method for displaying state information of an external device according to an embodiment of the present disclosure.

Referring to FIG. 11A, the terminal device 100 groups a mobile A, a mobile B, and a mobile C into a group A 15 and displays a music selection screen 27. The music A is selected by user's touch input 13.

Referring to FIG. 11B, the terminal device 100 displays state information 41a indicating that the music A is being played back in the external devices included in the group A 15. Here, a non-group setting region 17 is also displayed. The user may pause playback by one external device. Also, each external device may pause playback. In FIG. 11B, the user pauses playback by the mobile B.

Referring to FIG. 11C, the terminal device 100 may display state information indicating that playback of the music A by the mobile B is paused. That is, a pause 41b is displayed for the mobile B. This is merely an example and the state information may be displayed in various ways. For example, the external device that is playing back the content may be displayed in blue, the external device that pauses playback of the content may be displayed in red, and the external device that is standing by may be displayed in grey. Also, the external device that is playing back the content may be displayed in bold type, the external device that pauses playback of the content may be displayed in italics, and the external device that is standing by may be displayed in a general font style. Also, the external device that is playing back the content may be displayed with changed brightness, the external device that pauses playback of the content may be displayed without changing brightness, and the external device that is standing by may be displayed in grey.

The method and the UI for grouping external devices, transmitting a content to each group, and synchronizing and playing back the content have been described so far. The terminal device 100 may set a plurality of groups, divide a single stereo content by channel, and transmits the content to each group, thereby outputting a stereo sound.

Embodiment of Stereo Output

Figure 12A:
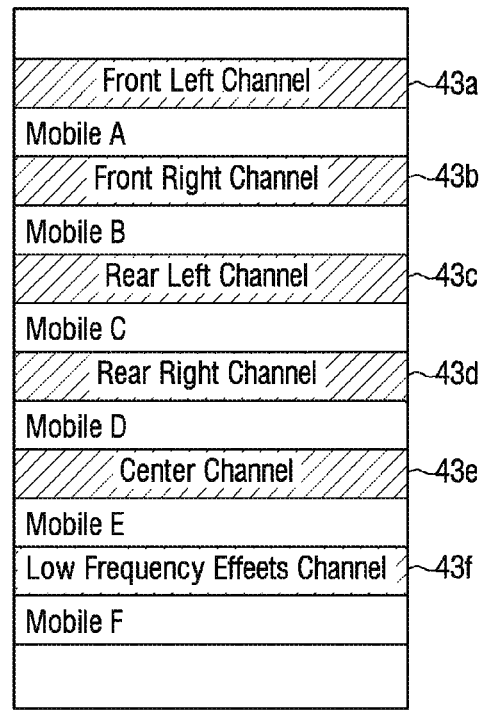
FIGS. 12A and 12B are views to explain a method for outputting a stereo sound according to an embodiment of the present disclosure.
Figure 12B:
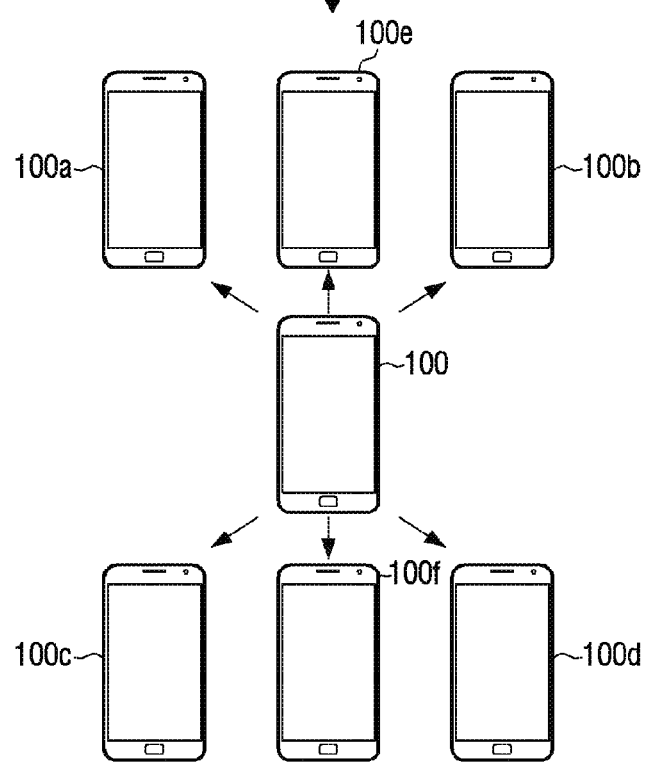

FIGS. 12A and 12B are views to explain a method for outputting a stereo sound according to an embodiment of the present disclosure.

Referring to FIG. 12A, when a stereo output menu is selected, the terminal device 100 displays a setting screen for a plurality of groups. When a selected content is a stereo content of 5.1 channels, the plurality of groups may be divided into a front left channel group 43a, a front right channel group 43b, a rear left channel group 43c, a rear right channel group 43d, a center channel group 43e, and a low frequency effects channel group 43f. When the selected content is a stereo content of two channels, the plurality of groups may be divided into a left channel group and a right channel group.

The terminal device 100 may display external devices that can share the content, and the user may add an external device to each group. In FIG. 12A, a mobile A 100a, a mobile B 100b, a mobile C 100c, a mobile D 100d, a mobile E 100e, and a mobile F 100f are included in the front left channel group 43a, the front right channel group 43b, the rear left channel group 43c, the rear right channel group 43d, the center channel group 43e, and the low frequency effects channel group 43f, respectively, When the content is selected and the groups are set, the terminal device 100 transmits a corresponding channel sound to each selected group.

Referring to FIG. 12B, the external device included in each group receives the channel sound from the terminal device 100, and outputs the channel sound. That is, the mobile A 100a receives and outputs a front left channel sound, and the mobile B 100b receives and outputs a front right channel sound. The mobile C 100c receives and outputs a rear left channel sound, and the mobile D 100d receives and outputs a rear right channel sound. The mobile E 100e receives and outputs a center channel sound, and the mobile F 100f receives and outputs a low frequency effects channel sound. As described above, the plurality of external devices receive and output respective channel sounds, thereby establishing a surround system wirelessly. Although terminal devices are explained in FIG. 12B, the surround system may be established using a speaker that has a function of receiving and outputting a content.

Embodiment of Group Control Screen

Figure 13A:
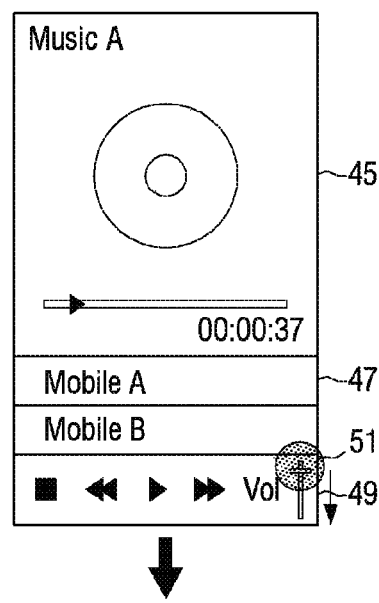
FIGS. 13A and 13B are views to explain a group control screen according to an embodiment of the present disclosure.
Figure 13B:
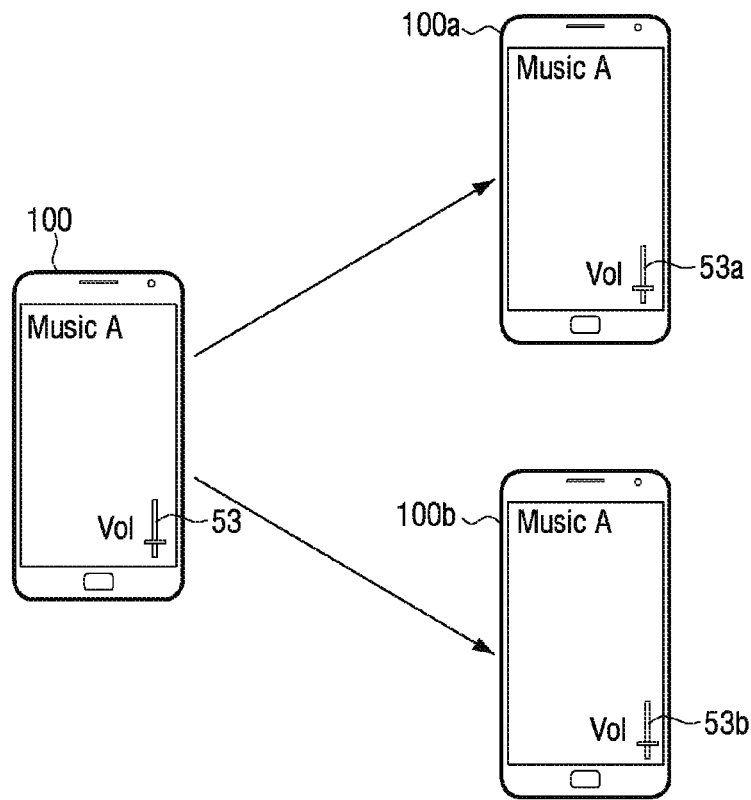

FIGS. 13A and 13B are views to explain a group control screen according to an embodiment of the present disclosure. When content sharing is executed, the terminal device 100 may display a content playback screen.

Referring to FIG. 13A, the content playback screen may display a content-related information region 45 which displays a content that is currently being played back, a predetermined image, and a state bar indicating a current playback time. The content playback screen may display a region 47 which displays an external device sharing the content, and a region 49 which displays a control menu related to the playback of the content. For example, the control menu may include items such as stop, rewind, fast forward, replay, pause, and volume control.

In FIG. 13A, the user may input 51 volume down to the terminal device 100. Accordingly, the terminal device 100 turns down the volume by reducing output of the content which is being played back. Also, the external devices that share the content may perform the same operation.

Referring to FIG. 13B, the terminal device 100 which transmits the content, and the external devices 100a and 100b which receive the content from the terminal device 100 and play it back are illustrated. The external devices 100a and 100b may display the same screen as that of the terminal device 100. According to circumstances, the external devices 100a and 100b which receive and play back the content may display a screen different from that of the terminal device 100. The user may input volume down to the terminal device 100 using a state bar 53. The control command input to the terminal device 100 is transmitted to the external devices 100a and 100b such that the external devices 100a and 100b perform an operation according to the control command That is, according to the volume down command input to the terminal device 100, the external devices 100a and 100b are remotely controlled to turn down the volume of the external devices 100a and 100b. The external devices 100a and 100b may display volume state bars 53a and 53b in order for the user to recognize the set volume intuitively. Also, the external devices 100a and 100b may turn down the volume without displaying the volume state bars. As described above, the terminal device 100 may remotely control the plurality of external devices that share the content.

That is, the terminal device 100, when an adjustment command such as volume down is input on one group, can transmit the adjustment command to an external device belonging to one group and simultaneously adjust a content output state of all the external devices.

Another Embodiment of Content Sharing

Figure 14A:
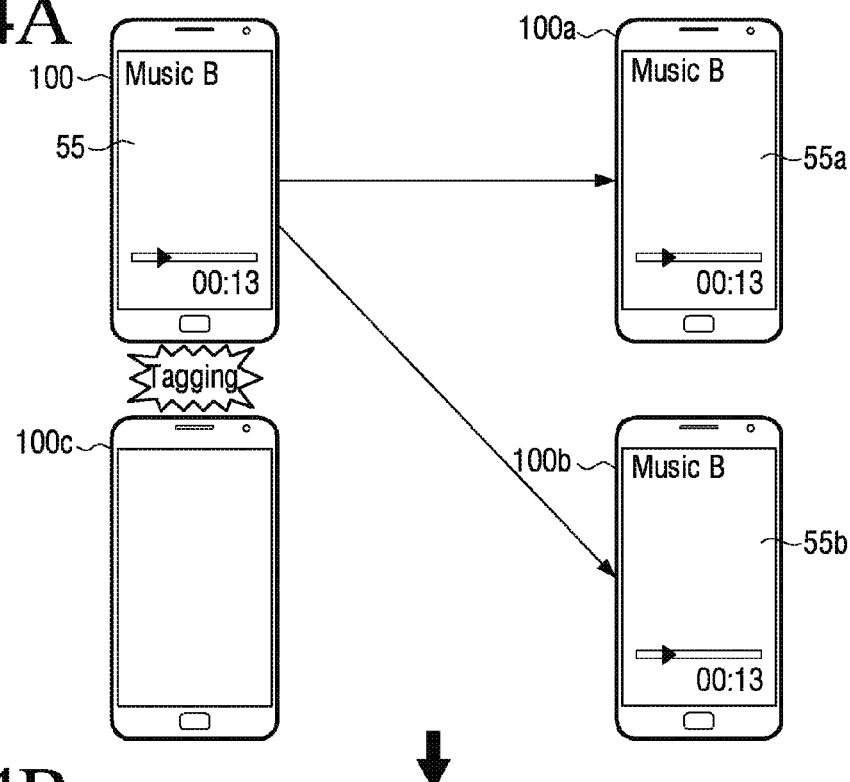
FIGS. 14A and 14B are views to explain a process of sharing a content using short-range wireless communication according to an embodiment of the present disclosure.
Figure 14B:
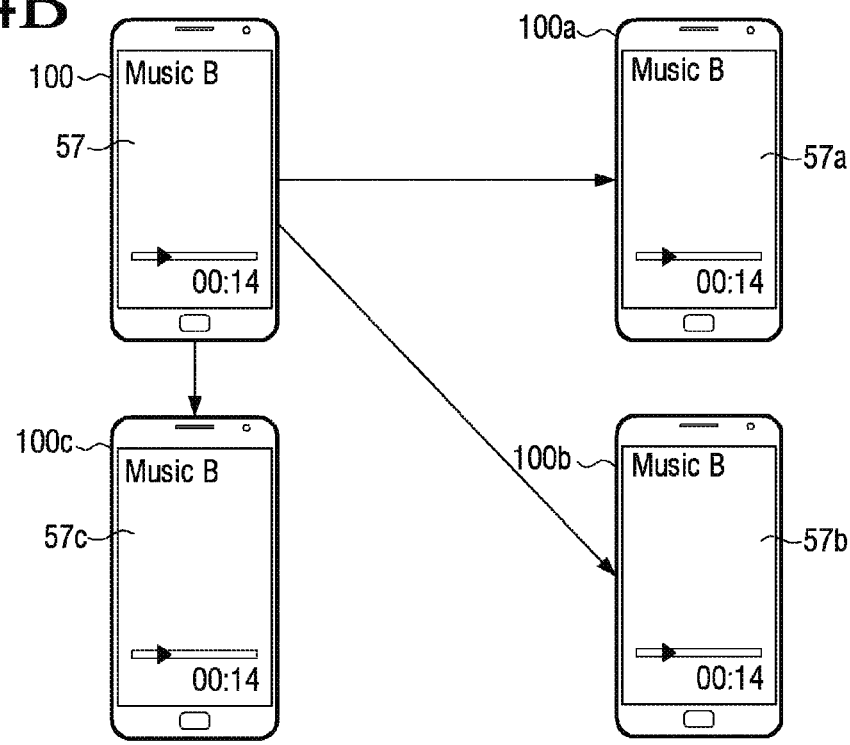

FIGS. 14A and 14B are views to explain a process of sharing a content using short-range wireless communication according to an embodiment of the present disclosure.

Referring to FIG. 14A, the terminal device 100 is playing back music B, and the music B is transmitted to first and second external devices 100a and 100b, synchronized and played back. That is, the multimedia part 140 plays back a content. In FIG. 14A, a state bar of a screen 55 of the terminal device 100 and state bars of screens 55a and 55b of the first and second external devices 100a and 100b display a current playback time of the music B, 00:13. A third external device 100c is tagged in the terminal device 100. At this time, the third external device 100c reads out connection information from the terminal device 100. That is, the short-range wireless communication module 113, when the terminal device 100 is tagged with the external device, shares connection information of the external device. The third external device 100 is connected with the terminal device 100 based on the read-out connection information and communicates with the terminal device 100. The third external device 100c may be tagged in the terminal device 100 and communicate with it while executing a content sharing mode. That is, the communicator 110 connects communication with the external device according to connection information. And, the controller 130, when communication is connected, controls the communicator 110 so that the synchronization signal and the played back content are transmitted to the external device.

Also, when the third external device 100c is connected to the same Access Point (AP) as that of the terminal device 100, and is tagged in the terminal device 100 while standing by or executing another application, the third external device 100c automatically enters the content sharing mode, executes an application for playing back the received content, is synchronized with the terminal device 100, and plays back the received content. The content sharing mode includes processes of establishing communication with the terminal device 100 to receive the content, and exchanging the content and sync information, and a process of executing the application for playing back the content. For example, the application for executing the content may execute a music playback player when the content is a music content and may execute a moving image playback player when the content is a moving image content.

The playback of the content of the third external device 100c may be synchronized with the playback of the content of the first and second external devices 100a and 100b, and the content may be played back. The third external device 100c may display an application for synchronizing and playing back by a tagging operation.

Referring to FIG. 14B, the third external device 100c receives the music B from the terminal device 100 by the tagging operation, and is synchronized with the first and second external devices 100a and 100b and plays back the music B. That is, a screen 57 of the terminal device 100 and screens 57a, 57b, and 57c of the first to third external devices display the music B which is being played back and display a current playback time, 00:14. As described above, the terminal device 100 may be tagged with another external device while sharing and playing back a content, and may be synchronized with another external device to share the content. That is, the controller 130, when communication is connected while the content is played back in the multimedia part 140, may control the communicator 110 so as to transmit a content, from among the played back contents, which is not played back when the communication is connected, to the tagged external device by a streaming method. In order to share the content by such a tagging operation, the terminal device 100 and the third external device 100c include short-range wireless communication modules 113 and 113c.

FIGS. 14A and 14B describe the case whether the terminal device 100 synchronizes a plurality of external devices 100a, 100b with a content, and when the content is being played back, a new external device 100c is tagged. However, it is also possible that the terminal device 100 is tagged with the initial one external device, and the terminal device 100 and one external device may synchronize and play back a content. Detailed process is similar to the process illustrated in FIGS. 14A and 14B.

Figure 15:
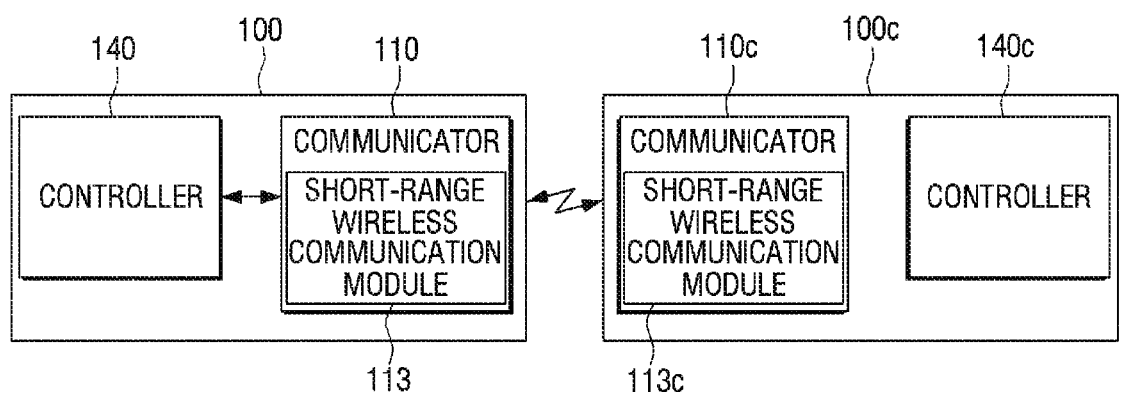
FIG. 15 is a block diagram illustrating a terminal device according to another embodiment of the present disclosure.

FIG. 15 is a block diagram illustrating a terminal device according to another embodiment of the present disclosure. That is, FIG. 15 is a block diagram illustrating the terminal device 100 including the short-range wireless communication module 113.

When the third external device 100c moves toward the terminal device 100 and tagging is performed between the third external device 100c and the terminal device 100, the short-range wireless communication module 113c included in the terminal device 100 reads out information of the short-range wireless communication module 113c included in the third external device 100c.

The "tagging" recited herein refers to a movement of at least one of the terminal device 100 and the third external device 100c to a communication allowable range in which short-range wireless communication is performed. When at least one of the terminal device 100 and the third external device 100c approaches such a range, the short-range wireless communication module 113c of the third external device 100c reads out information recorded on the short-range wireless communication module 113 of the terminal device 100. An example of the short-range wireless communication may be near field communication (NFC). The NFC is a non-contact short-range wireless communication method that uses a frequency band of 13.56 Mz. According to the NFC technology, when a plurality of terminals approach one another within a short distance such as about 10 cm, data may be exchanged.

Referring to FIG. 15, the terminal device 100 includes a communicator 110 including the short-range wireless communication module 113, and a controller 130, and the third external device 100c includes a communicator 110c including the short-range wireless communication module 113c, and a controller 130c. The short-range wireless communication modules 113 and 113c include a short-range wireless communication tag (not shown) and a short-range wireless communication reader (not shown).

The short-range wireless communication tag may include an Integrated Circuit (IC) and an antenna coil. When the third external device 100c including the short range wireless communication reader is tagged, the short-range wireless communication tag is driven by electromagnetic waves emitted from the short-range wireless communication reader and transmits a Radio Frequency (RF) signal carrying connection information.

That is, a current is induced in the antenna coil of the short-range wireless communication tag by the electromagnetic waves emitted from the short-range wireless communication reader. A capacitor included in the short-range wireless communication tag is charged with the induced current. The IC is driven by the current with which the capacitor is charged, and generates an RF signal by modulating and coding pre-stored connection information.

The short-range wireless communication tag may generate the RF signal according to a predetermined modulating and coding method from among various kinds of modulating and coding methods. That is, modulating refers to a method for carrying data by changing an amplitude, a frequency, and a phase of an RF carrier signal which is exchanged between the short-range wireless communication tag and the short-range wireless communication reader. The modulating may be performed using Amplitude Shift Keying (ASK), Frequency Shift Keying (FSK), or Phase Shift Keying (PSK). The ASK is a method that shifts an amplitude of a carrier signal according to whether an information signal of a digital format is 0 or 1. For example, when the information signal is 0, the amplitude of the carrier signal is reduced, and, when the information signal is 1, the amplitude is increased. 1 bit may be transmitted using a two-stage amplitude, and 2 bits may be transmitted simultaneously using different 4-stage amplitudes. The FSK is a method that assigns 0 and 1 bis, which are digital signals, to two kinds of frequencies (e.g., a low frequency and a high frequency) and transmits data. For example, when the information signal is 0, the information signal is transmitted at a frequency lower than the carrier frequency, and, when the information signal is 1, the information signal is transmitted at a frequency higher than the carrier frequency. The PSK is a method that changes a phase of a carrier according to data to be transmitted. An amount of change in the phase may be determined according to the data. When data to be transmitted is 0, the phase of the carrier is changed by 180 degrees, and, when the data is 1, the phase of the carrier is changed by 90 degree, and the information is transmitted on a bit basis piece by piece.

A modified Miller coding method and a Manchester coding method may be used.

The modulating and coding methods to be used in the short-range wireless communication tag may be appropriately set considering a type of a device and a communication speed. For example, when the short-range wireless communication tag is a passive type which does not include a cell and is driven by the current induced by the electromagnetic waves emitted from the short-range wireless communication reader, the ASK method and the Manchester coding method may be applied. On the other hand, when the short-range wireless communication tag is an active type which communicates with an external short-range wireless communication reader while retaining micropower, the ASK and the modified Miller coding method may be applied at the speed of 106 kbps, and the ASK and the Manchester coding method may be applied at the speed of 212 kbps or 424 kbps.

As described above, when the short-range wireless communication tag performs short-range wireless communication tagging with the third external device 100c including the short-range wireless communication reader, the short-range wireless communication tag provides connection information to the third external device 100c. The connection information may be provided from a storage element of the short-range wireless communication tag or a storage element embedded in the terminal device 100. The connection information refers to information for connecting with the terminal device 100 for communication. Specifically, the connection information includes a Service Set Identifier (SSID) and a key of the terminal device 100. The controller 130 executes a wireless communication function and controls the communicator 110 to connect with the third external device 100c for communication.

When the short-range wireless communication reader achieves short-range wireless communication tagging with the terminal device 100, the short-range wireless communication reader accesses the short-range wireless communication tag included in the terminal device 100 and reads out connection information. The short-range wireless communication reader may include an RF module and an antenna coil. The short-range wireless communication reader emits electromagnetic waves through the antenna coil. Accordingly, a current is induced in the short-range wireless communication tag in an electromagnetic induction method, thereby driving the IC. The IC of the short-range wireless communication tag transmits the RF signal including the connection information as described above. The radio frequency module of the short-range wireless communication reader receives the RF signal through the antenna coil, and detects the connection information from the RF signal by demodulating and decoding the RF signal. The demodulating and decoding corresponds to the modulating and coding which is used in the short-range wireless communication tag, and thus a redundant explanation is omitted. When the connection information is received through the short-range wireless communication reader, the controller 130*c* controls the communicator 110*c* to access the terminal device 100.

The communicator 110*c* accesses the terminal device 100 using the connection information read out by the short-range wireless communication reader and is connected with the terminal device 100 for communication. The communicator 110*c* may communicate with the terminal device 100 in one of various communication methods such as Wi-Fi, Bluetooth, and Zigbee.

Figure 16A:
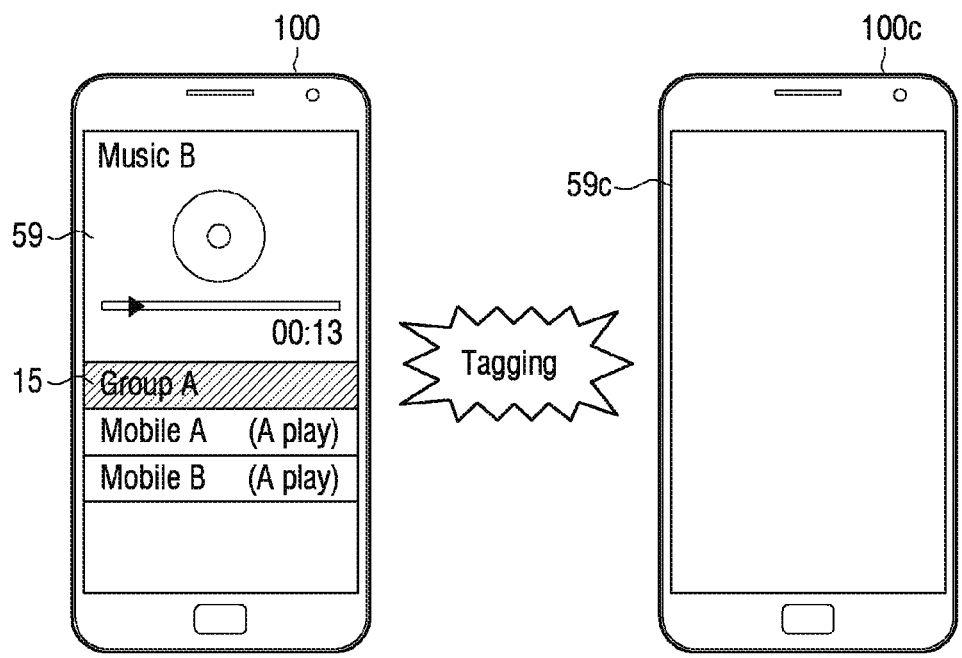
FIGS. 16A and 16B are views to explain a process of grouping external devices using short-range wireless communication according to an embodiment of the present disclosure.
Figure 16B:
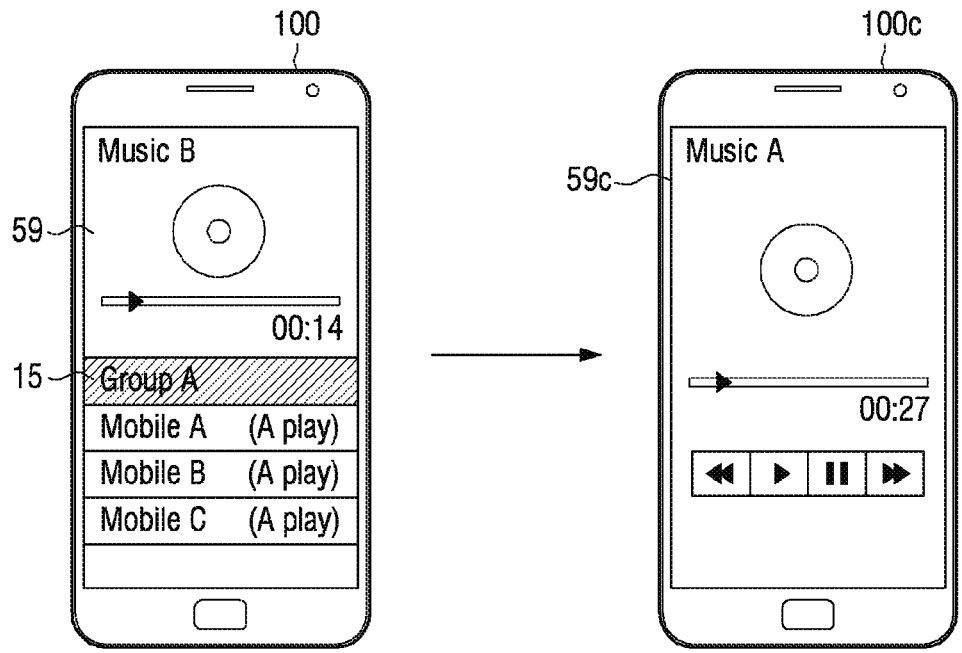

FIGS. 16A and 16B are views illustrating a process of grouping external devices using short-range wireless communication according to an embodiment of the present disclosure.

Referring to FIG. 16A, the terminal device 100 is playing back music B and displays a playback screen 59. The user may select one of a plurality of groups set in the terminal device 100. Referring to FIGS. 16A and 16B, the user selects a group A 15. The terminal device 100 displays the selected group A 15 on a certain region of the display 120 separately from the content which is being played back. The group A 15 includes a terminal device A and a terminal device B, and synchronizes the music A and plays it back.

At this time, a terminal device C 100*c* is tagged in the terminal device 100 which is transmitting the content. The process of connecting with the terminal device 100 which transmits the content by means of a tagging operation of the terminal device C 100*c* has been described above, and thus an explanation thereof is omitted.

Referring to FIG. 16B, the tagged terminal device 100*c* is included in the group A 15 displayed on the terminal device 100 which transmits the content. The terminal device 100, which transmits the content, transmits the music A, which is transmitted to the group A 15, to the tagged terminal device C 100*c*. The terminal device C 100*c* may be set to a content sharing mode prior to being tagged, and then may be tagged in the terminal device 100 which transmits the content and may share the content. Also, when the terminal device C 100*c* is connected to the same AP as that of the terminal device 100 which transmits the content, and is tagged in the terminal device 100 while standing by or executing another application, the terminal device C 100*c* may automatically enter the content sharing mode.

The terminal device C 100*c* plays back the music A which is synchronized with the terminal device A and the terminal device B included in the group A 15. That is, referring to FIG. 16B, the terminal device 100 which transmits the content displays the playback screen 59 showing that the music B is being played back, and the selected group A. The terminal device C 100*c* is included in the group A and displays a playback screen 59*c* showing that the music A which is transmitted to the devices of the group A is being played back. For example, the terminal device C 100*c* may display an image corresponding to music, a playback time, and a control menu to control the played back content.

While the terminal device 100 outputs a synchronized stereo sound to a plurality of external devices, the terminal device 100 may add another external device to one channel group.

Meanwhile, when a plurality of groups are set, the terminal device 100, when tagged with a new external device, may display the grouping screen, and when one of the plurality of groups displayed on the grouping screen is selected, include the tagged new external device in the selected group.

Figure 17A:
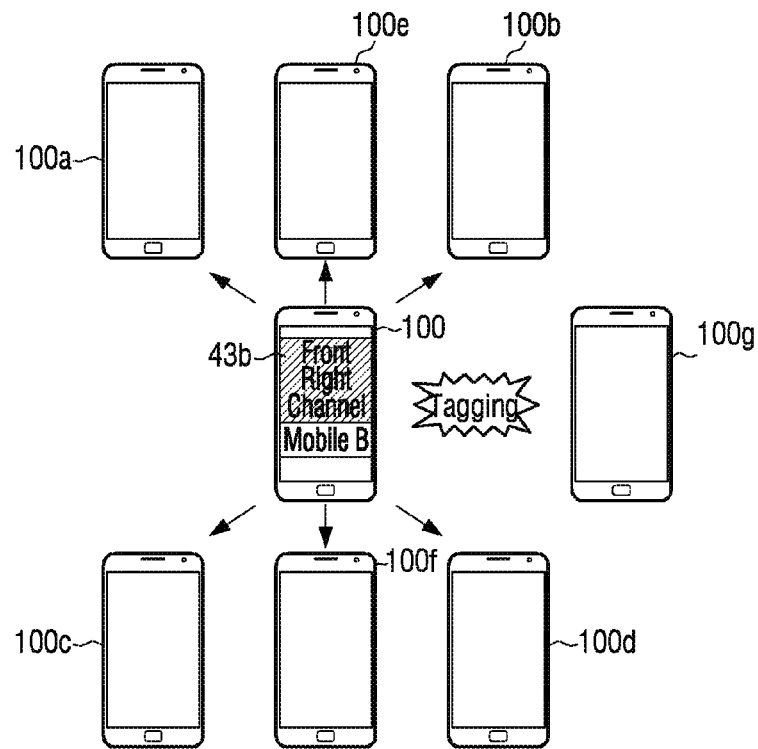
FIGS. 17A and 17B are views to explain a method for outputting a stereo sound according to another embodiment of the present disclosure.
Figure 17B:
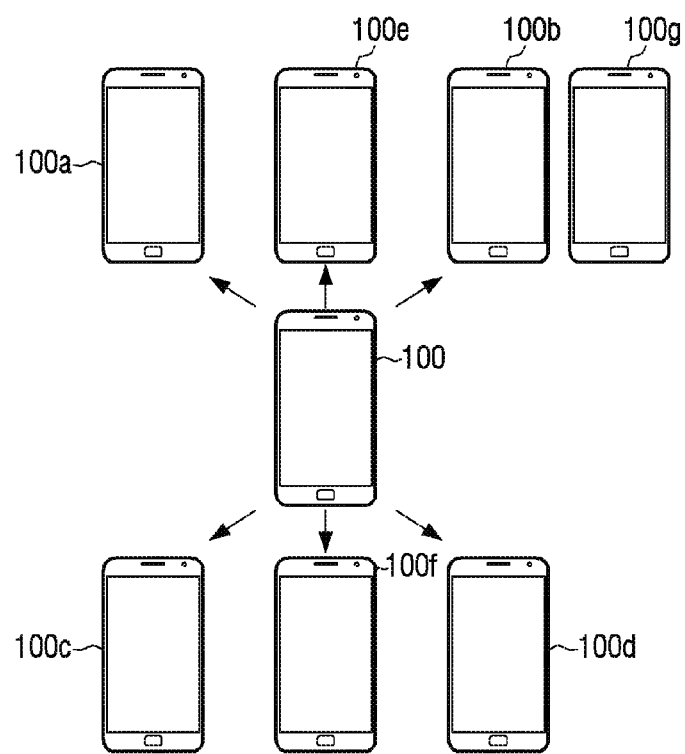

FIGS. 17A and 17B are views to explain a method for outputting a stereo sound according to another embodiment of the present disclosure.

Referring to FIG. 17A, the terminal device 100 sets a plurality of channel groups, synchronizes a stereo sound and outputs the stereo sound. The controller 130, when the new external device 100*g* is tagged, may process that a preset channel sound among a plurality of channel sounds composing a synchronization signal and an audio signal of a content are output in the tagged external device. The preset channel sound may be a channel sound preset in the terminal device 100, and may be the channel sound selected by a user. The controller 130, may detect an audio signal included in one content from a content, and classify an audio signal into a plurality of different channel sounds. For example, a plurality of channel sounds may be a front left channel sound, a front right channel sound, a rear left channel sound, a rear right channel sound, a center channel sound, and a low frequency effects channel sound.

A mobile A 100*a* receives and outputs a front left channel sound, and a mobile B 100*b* receives and outputs a front right channel sound. A mobile C 100*c* receives and outputs a rear left channel sound, and a mobile D 100*d* receives and outputs a rear right channel sound. A mobile E 100*e* receives and outputs a center channel sound, and a mobile F 100*f* receives and outputs a low frequency effects channel sound.

The user selects a front right channel group 43*b* on the terminal device 100. Since the current front right channel group 43*b* includes only the mobile B, only the mobile B 100*b* is displayed on the screen of the terminal device 100. At this time, a mobile G 100*g* is tagged. When the mobile G 100*g* is tagged in the terminal device 100, the terminal device 100 and the mobile G 100*g* exchanges connection information with each other and establish communication. The terminal device 100 adds the mobile G 100*g* to the front right channel group. The terminal device 100 synchronizes the front right channel sound with the mobile G 100*g*, and transmits the front right channel sound to the mobile G 100*g*.

The mobile G 100*g* may be set to a content sharing mode prior to being tagged. Also, when the mobile G 100*g* is connected to the same AP as that of the terminal device 100, the mobile G 100*g* may be automatically converted from a standby mode into the content sharing mode, receive a corresponding content, and play back the content.

Referring to FIG. 17B, the mobile G 100*g* receives the front right channel sound from the terminal device 100, and synchronizes and plays it back. The front right channel group 43*b* of the terminal device 100 includes the mobile B 100*b* and the mobile G 100*g*. The terminal device 100 may play back a stereo content including all channel sounds, or may play back only a specific channel sound. Also, the terminal device 100 may not play back a content and may control only a playback operation of each channel group.

In some cases, the terminal device 100 can transmit the preset channel sound information, the audio signal, and the synchronization signal to each external device. Each external device may classify the channel sound from the received audio signal by using the received channel sound information, and output one channel sound by using the synchronization signal.

The method for sharing the content and the content sharing screen according to various embodiments have been described so far. Hereinafter, a terminal device will be explained in detail with reference to a block diagram.

Figure 18:
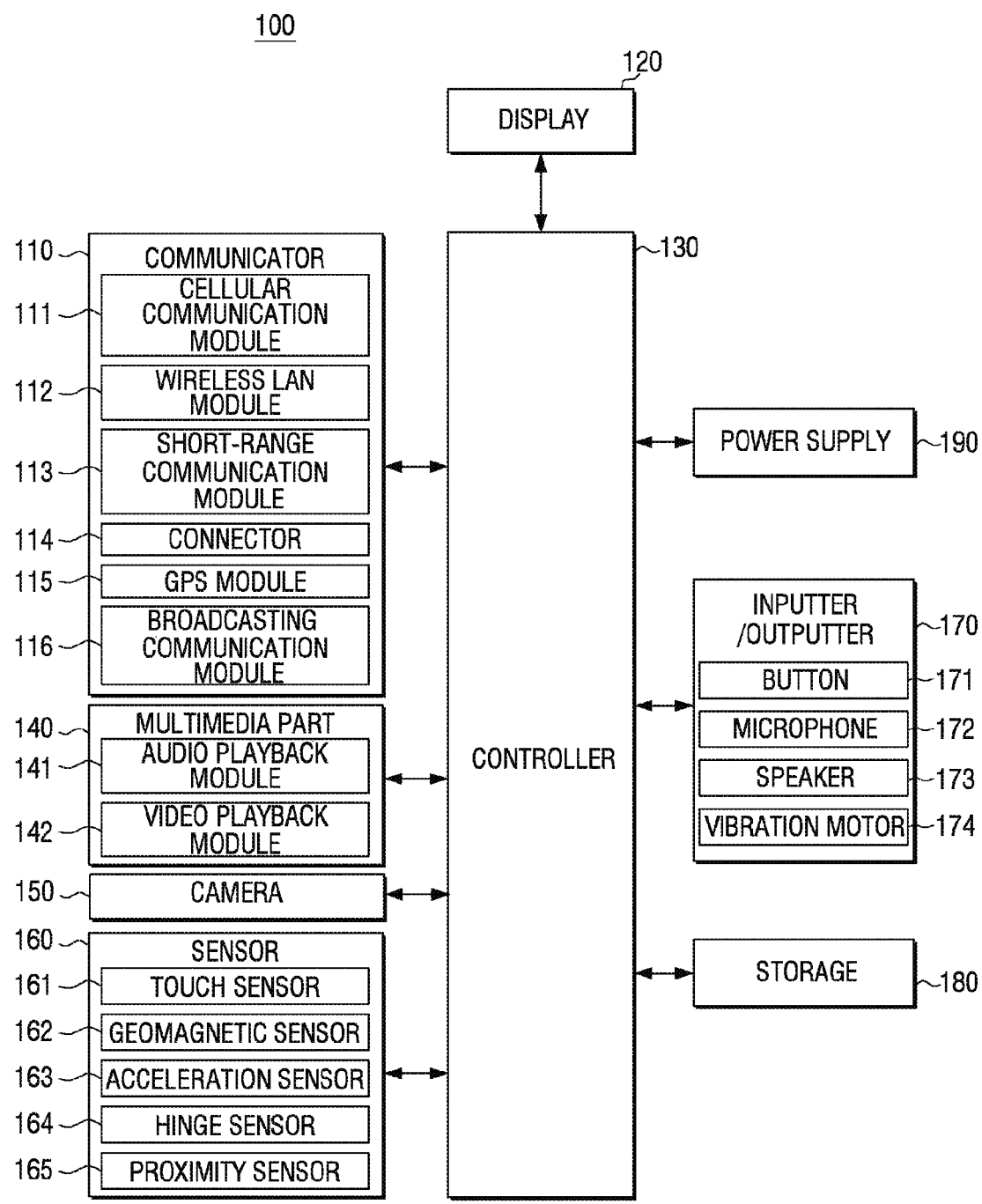
FIG. 18 is a block diagram to explain a configuration of a terminal device according to various embodiments of the present disclosure.

FIG. 18 is a block diagram to explain a configuration of a terminal device according to various embodiments of the present disclosure.

Referring to FIG. 18, the terminal device 100 includes a communicator 110, a display 120, a controller 130, a multimedia part 140, a camera 150, a sensor 160, an inputter/outputter 170, a storage 180, and a power supply 190.

The communicator 110 includes a cellular communication module 111, a wireless Local Area Network (LAN) module 112, a short-range communication module 113, a connector 114, a Global Positioning System (GPS) module 115, and a broadcasting communication module 116.

The cellular communication module 111 uses wireless access technology according to a cellular communication protocol under the control of the controller 130, and allows the terminal device 100 to be connected with an external device (in particular, a base station of a cellular system) through at least one antenna or a plurality of antennas (not shown).

Also, the cellular communication module 111 exchanges radio signals containing a voice, a video, a Short Messaging Service (SMS) message, or a Multimedia Messaging Service (MMS) message with another device which is accessible by the terminal device 100, such as a mobile phone having a phone number input to the terminal device 100, a smart phone, and a tablet PC.

The wireless LAN module 112 may be connected with the internet in a place where a wireless AP is installed under the control of the controller 130. The wireless LAN module 112 supports the wireless LAN standard (e.g., IEEE 802.11x) of the IEEE.

The short-range communication module 113 enables short-range wireless communication between the terminal device 100 and an external device under the control of the controller 130. The short-range communication method includes Bluetooth, Infrared ray Data Association (IrDA), and NFC.

The connector 114 provides an interface for various devices, such as Universal Serial Bus (USB) 2.0, USB 3.0, High-Definition Multimedia Interface (HDMI), and IEEE 1394. The connector 114 may be used as an interface for connecting the terminal device 100 with an external device or a power source. The terminal device 100 may transmit data which is stored in the storage 180 to an external device through a cable connected to the connector 114 under the control of the controller 130, or may receive data from the external device through the cable. Also, power may be input from the power source or a battery (not shown) may be charged through the cable connected to the connector 114.

The GPS module 115 may receive electromagnetic waves from a plurality of GPS satellites (not shown) orbiting around the earth, and may calculate a location of the terminal device 100 using a time of arrival from the GPS satellites (not shown) to the terminal device 100 and GPS parameters.

The broadcasting communication module 116 may receive a broadcast signal (for example, a TV broadcast signal, a radio broadcast signal, or a data broadcast signal), and broadcast additional information (for example, Electronic Program guide (EPG) or Electronic Service Guide (ESG) from a broadcasting station through a broadcasting communication antenna (not shown) under the control of the controller 130.

The display 120 displays a multimedia content, an image, a moving image, and a text under the control of the controller 130. The display 120 may be implemented by using a general display panel without a touch input function, or may be implemented by using a touch display panel that can recognize user's manipulation using a proximity sensor or a touch sensor. When the display 120 is implemented by using a touch display panel, the display 120 may receive at least one touch gesture through a user's body (for example, fingers including the thumb) or an inputting means which can be sensed (for example, a stylus pen).

The user interface may include a predetermined touch region, a soft key, and a soft menu. The display 120 may transmit an electronic signal corresponding to at least one touch gesture which is input through the user interface to the display 120 through an LCD controller (not shown). Also, the display 120 may sense a continuous movement of a touch, and may transmit an electronic signal corresponding to a continuous or discontinuous movement of a touch to the LCD controller.

The display 120 may be implemented in a resistive method, a capacitive method, an infrared ray method, or an acoustic wave method.

The display 120 converts a sensing signal which is related to a user operation sensed through the touch sensor into a digital signal (for example, X and Y coordinates), and transmits the digital signal to the controller 130. The controller 130 may perform a control operation corresponding to the user operation input through the display 120 using the received digital signal. For example, the controller 130 may select a soft key displayed on the display 120 or may execute an application corresponding to the soft key in response to the user operation.

The above-described user gesture is not limited to a direct contact of the user's body or the inputting means with which the user can touch with the display 120, and may include a non-contact method. A sensitivity of a user operation detectable by the display 120 may be changed according to the performance or configuration of the terminal device 100.

The controller 130 includes a Central Processing Unit (CPU), a Read Only Memory (ROM) which stores a control program for controlling the terminal device 100, and a Random Access Memory (RAM) which memorizes signals or data input from an external source, or is used as a memory region for a job performed in the terminal device 100. The CPU may include at least one of a single core processor, a dual core processor, a triple core processor, and a quad core processor. The CPU, the ROM, and the RAM are connected with one another through an internal bus.

The controller 130 controls the communicator 110, the display 120, the controller 130, the multimedia part 140, the camera 150, the sensor 160, the inputter/outputter 170, the storage 180, and the power supply 190.

The multimedia part 140 includes an audio playback module 141 and a video playback module 142. The audio playback module 141 may play back a digital audio file which is stored or received (for example, a file having an extension of mp3, wma, ogg, or way) under the control of the controller 130. The video playback module 142 supports codecs of various formats to play back a digital video file. That is, the video playback module 142 plays back a video file according to a codec which is pre-stored according to a codec format of the video file to be played back. Also, the audio playback module 141 or the video playback module 142 of the multimedia part 140 may be included in the controller 130.

The camera 150 photographs a still image or a moving image under the control of the controller 130. The camera 150 may include a plurality of cameras. The camera 150 may include an auxiliary light source (for example, a flash (not shown)) to provide light necessary for photographing.

The camera 150 transmits a photographed image to the controller 130. The controller 130 analyzes the image and detects a user's motion or shape, and performs a control operation corresponding to the detected motion or shape. For example, the user's motion refers to a hand motion of the user that is detected through the camera 150. The user's shape refers to a facial shape of the user that is detected through the camera 150.

According to another embodiment of the present disclosure, the terminal device 100 may detect a user's motion using other means such as an infrared ray sensor, and may execute or control an application in response to the motion.

The sensor 160 may include at least one of a touch sensor 161, a geomagnetic sensor 162, an acceleration sensor 163, a hinge sensor 164, and a proximity sensor 165.

The touch sensor 161 is a sensor that senses a user's touch on the display 120. The touch sensor 161 may be divided into a capacitive touch sensor and a piezoelectric touch sensor according to how to sense a user's t ouch. According to an embodiment of the present disclosure, the touch sensor 161 may be implemented by using the two types of touch sensors. The touch sensor 161 may constitute the display along with a display panel.

The touch sensor 161 is a sensor that inputs an instruction displayed on a display screen by pressing a touch screen with a body such as a finger or an inputting means that can be sensed. The touch sensor 161 uses a change in capacitance, resistance, or an amount of light.

The geomagnetic sensor 162 senses azimuth by detecting terrestrial magnetism. Accordingly, the geomagnetic sensor 162 recognizes a direction of the terminal device 100. The acceleration sensor 163 is a sensor that processes an output signal and measures a dynamic force such as acceleration, vibration, or shock of an object, and senses a change in the speed of the terminal device 100 or an intensity of force. The hinge sensor 164 may sense an angle or a motion of a hinge. The proximity sensor 165 may sense whether an object approaches the terminal device 100 of the user.

Although not shown in FIG. 18, the sensor 160 of the terminal device 100 may further include at least one of a gravity sensor which senses in which direction gravity is acted, a gyro sensor which recognizes 6 axes in total by adding rotation to an existing acceleration sensor, an orientation sensor which automatically senses horizontal and vertical frames of a content such as an image and automatically rotates and arranges the content, a luminance sensor which senses an amount of ambient light around the terminal device 100, an altitude sensor which measures atmospheric pressure, a Red Green Blue (RGB) sensor which senses a color of an object, a distance sensor which measures a distance using an ultrasonic wave or infrared rays, and a hall sensor which uses a change in a voltage according to a magnitude of a magnetic field.

Each of the sensors of the sensor 160 detects a state, generates a signal corresponding to a result of the sensing, and transmits the signal to the controller 130. The sensors of the sensor 160 may be added or deleted according to the performance of the terminal device 100.

The inputter/outputter 170 includes a button 171, a microphone 172, a speaker 173, and a vibration motor 174.

At least one button 171 may be formed on a front surface, a side surface, or a rear surface of a body of the terminal device 100 in the form of a push type or a touch type, and may include at least one of a power/lock button, a volume control button, a menu button, a home button, a back button, and a search button.

The microphone 172 receives a voice or a sound under the control of the controller 130 and generates an electric signal.

The speaker 173 may output sounds corresponding to various signals of the cellular communication module 111, the wireless LAN module 112, the short-range communication module 113, the multimedia part 140, or the camera 150 (for example, a radio signal, a broadcast signal, a digital audio file, a digital moving image file, or photographing) to the outside of the terminal device 100.

The speaker 173 may output a sound corresponding to a function of the terminal device 100 (for example, a button sound or a ringtone corresponding to calling). A single speaker 173 or a plurality of speakers 173 may be formed on an appropriate location or locations of the body of the terminal device 100. For example, the speaker 173 may include an internal speaker module which is formed on a location which is in the proximity to user's ears when the user is on the phone, and an external speaker module which has higher output suitable for playing back audio/video files or viewing a broadcast, and is disposed on an appropriate location of the body of the terminal device 100.

The vibration motor 174 converts an electric signal into a mechanical vibration under the control of the controller 130. For example, when a voice call is received from another device (not shown), the terminal device 100 which is in a vibration mode drives the vibration motor 174. A single vibration motor 174 or a plurality of vibration motors 174 may be disposed in the body of the terminal device 100. The vibration motor 174 may be operated in response to a user's touch gesture sensed on the display 120, and a continuous movement of a touch sensed on the display 120.

The storage 180 stores various multimedia data processed by the controller 130, content data, and data received from an external source.

The storage 180 may store control programs and applications for controlling the terminal device 100 or the controller 130. Hereinafter, the term "storage" may include a memory card (for example, a Secure Digital (SD) card or a memory stick) that can be mounted into or dismounted from the ROM, the RAM, or the terminal device 100. The storage 180 may include a non-volatile memory, a volatile memory, a Hard Disk Drive (HDD), or a Solid State Drive (SSD).

The power supply 190 supplies power to be used in the terminal device 100. The power supply 190 may be implemented by using a rechargeable battery, and may further include a voltage converter to convert an external power source and supply it to a rechargeable battery.

The power supply 190 may supply power to the terminal device 100 in various modes such as a maximum performance mode, a general mode, a power saving mode, and a standby mode under the power control of the controller 130.

The terminal device including the above-described configuration includes a system hierarchy to perform various functions. Hereinafter, the system hierarchy of the terminal device will be explained.

Figure 19:
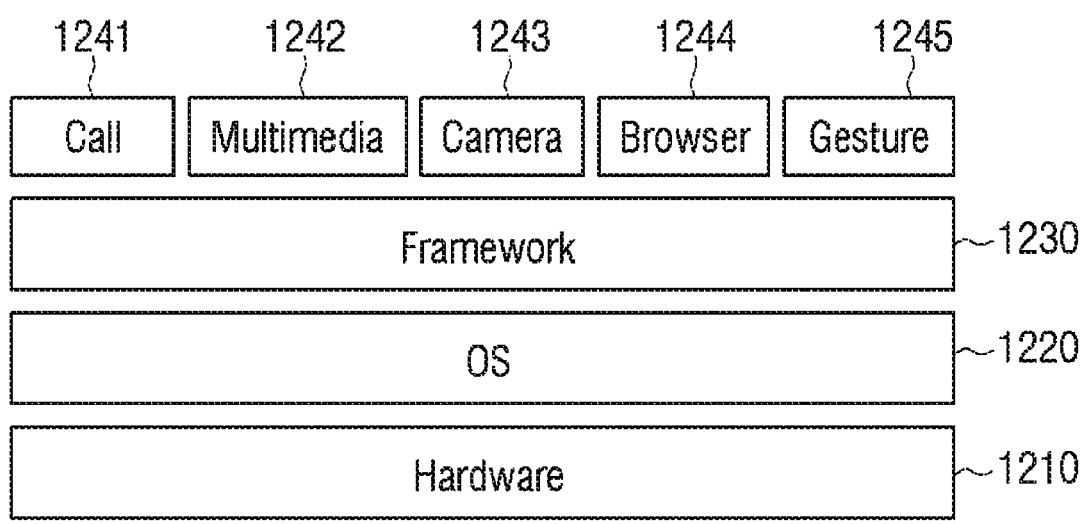
FIG. 19 is a view to explain a system hierarchy of a terminal device according to an embodiment of the present disclosure.

FIG. 19 is a view to explain a system hierarchy of a terminal device according to an embodiment of the present disclosure.

The terminal device may include not only hardware 1210 but also a variety of software such as an Operating System (OS) 1220, a framework 1230, a call application 1241, a multimedia application 1242, a camera application 1243, a browser 1244, and a gesture recognition application 1245.

The hardware 1210 may include various elements as shown in FIG. 18.

The OS 1220 controls an overall operation of the hardware 1210 and manages the hardware 1210. That is, the OS 1220 is a layer that is in charge of basic functions such as hardware management, memory, and security. The OS 1220 controls the operation of the terminal device by driving modules such as a display driver to drive the display, a communication driver to exchange data, a camera driver to drive the photographer, an audio driver to drive an audio part, and a power manager.

The framework 120 is an upper layer of the OS 1220. The framework 1230 connects the application layer and the OS layer 1220. That is, the framework layer 1230 includes a location manager, a notification manager, and a frame buffer to display an image on the display.

The application layer exists above the framework layer 120 to perform various functions of the terminal device 100. For example, the application layer may include various applications such as a call application 1241, a multimedia application 1242, a camera application 1243, a browser application 1244, and a gesture recognition application 1245.

The terminal device 100 may receive a command using a touch or key pad, and may receive a command by sensing hovering.

Figure 20:
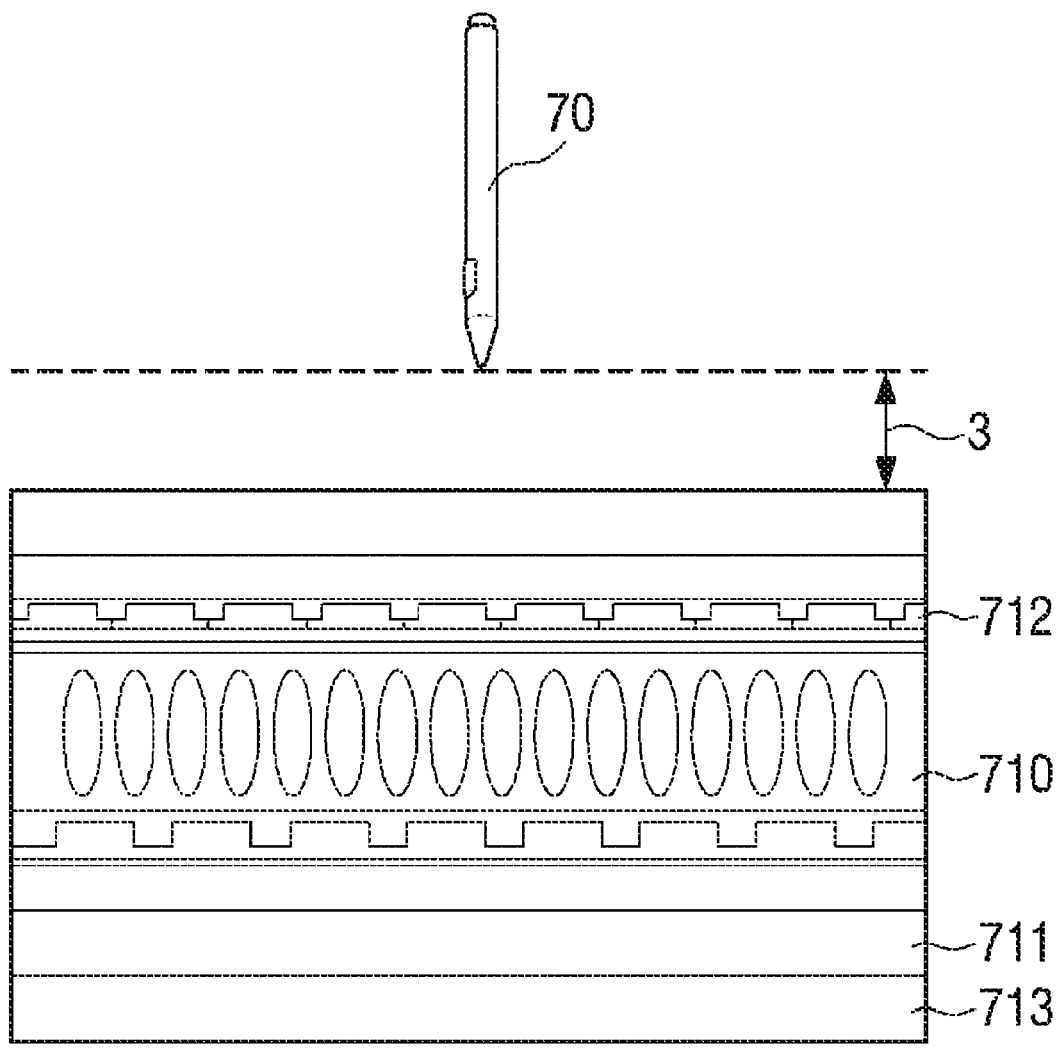
FIG. 20 is a view to explain a method for sensing hovering according to an embodiment of the present disclosure.

FIG. 20 is a view to explain a method for sensing hovering according to an embodiment of the present disclosure. The hovering is a kind of touch gesture that is recognized when a user's movement is recognized within a predetermined effective recognition range in a space without a direct touch on a touch screen.

The user may input a control command to the terminal device 100 in a hovering method using a specific pen.

Referring to FIG. 20, the terminal device 100 includes a display panel 710, a proximity sensor source 711, and an infrared ray sensor 712. The display includes a static electricity sensor 713. The static electricity sensor 713 may include a plurality of coils.

When a user object such as user's hand approaches an effective recognition region 3, the infrared ray sensor 712 senses infrared rays reflected from the approaching user object and generates an infrared ray scan image. Specifically, the infrared ray sensor 712 generates an infrared ray scan image corresponding to infrared rays which are reflected from the approaching user object using a plurality of infrared ray sensing elements which are arranged in an array pattern. The terminal device 100 may sense input of hovering using the generated infrared ray scan image.

A pen 70 may include a coil in order for the terminal device 100 to recognize hovering. When the pen 70 including the coil approaches within a predetermined distance 3, a current is induced in the coil of the static electricity sensor 713 due to electrostatic induction. The closer the pen 70 is to the coil, the greater the current is induced, and the further the pen 70 is away from the coil, the smaller the current is induced. Accordingly, the controller recognizes a point at which the greatest current is induced as a place over which the pen is placed 70.

The display shown in FIG. 20 includes the infrared ray sensor 712. Therefore, when the pen 70 approaches within a predetermined distance, the infrared ray sensor 712 and the static electricity sensor 713 may recognize approach of the pen 70. Accordingly, a result of sensing by the static electricity sensor 713 is recognized in preference to that of the infrared ray sensor 712, and thus double recognition can be prevented.

The configuration and the hierarchy of the terminal device have been described so far. Hereinafter, a method for controlling of a terminal device will be explained.

Figure 21:
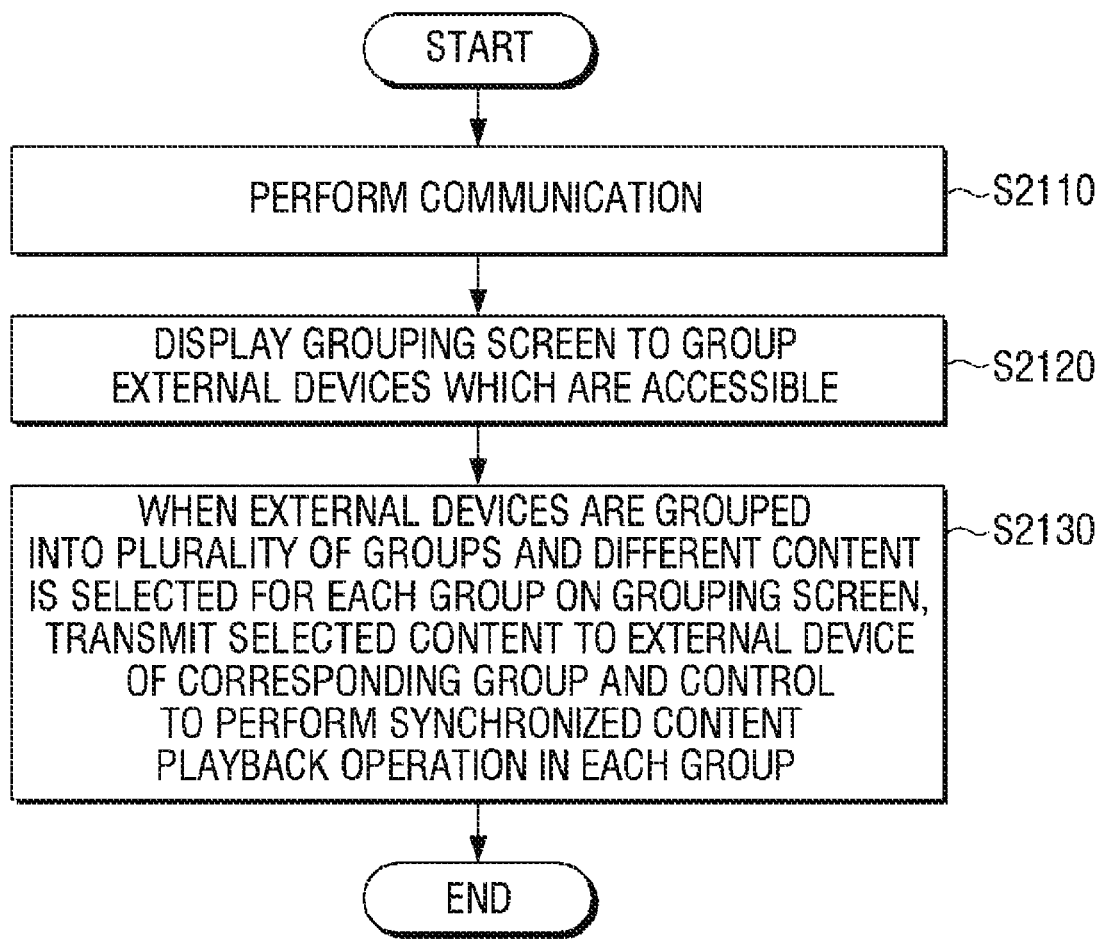
FIG. 21 is a flowchart illustrating a method for controlling of a terminal device according to an embodiment of the present disclosure.

FIG. 21 is a flowchart illustrating a method for controlling of a terminal device according to an embodiment of the present disclosure.

Referring to FIG. 21, the terminal device performs communication at operation S2110. The terminal device searches for an external device that is accessible when a content sharing command is input. The external device may be various kinds of devices such as a mobile phone, a notebook PC, a tablet PC, a speaker, an electronic album, a desktop PC, a PDA, a digital audio player, a navigation system, and a monitor. The content sharing may be performed using DLNA.

The terminal device displays a grouping screen to group the external devices which are accessible at operation S2120. The terminal device may display a selection screen of a content, and, when a content is selected, may display the grouping screen to group the external devices. Also, when the grouping screen is displayed and the external devices are grouped, the terminal device may display a content section screen.

When the external devices are grouped into a plurality of groups on the grouping screen and a different content to be transmitted to each group is selected for each group, the terminal device transmits each selected content to an external device belonging to a corresponding group, and controls to perform a synchronized content playback operation in each group at operation S2130. The terminal device may transmit a sync signal packet so that an external device synchronizes the content and plays it back. For example, the terminal device may transmit a content A to a group A, a content B to a group B, and a content C to a group C while playing back the content A. The external devices belonging to each group may play back the content which is synchronized for each group and received.

The terminal device may transmit the content that is being played back to an external device while playing back the content. That is, the terminal device plays back a content. When a content sharing command is input while the terminal device is playing back a content, the terminal device communicates with an external device. When an external device that is accessible is searched, the terminal device displays a grouping screen to group the external devices. When the external devices are grouped into one group on the grouping screen, the terminal device transmits the content which is being played back to all of the external devices belonging to the group simultaneously, and synchronizes a content playback operation of the external devices of the group with a content playback operation of the terminal device. Through the above-described process, the terminal device may newly add an external device to a predetermined group while playing back a content, may transmit the content to the external device, and synchronize the content playback operation of the external device with the content playback operation of the terminal device.

Figure 22:
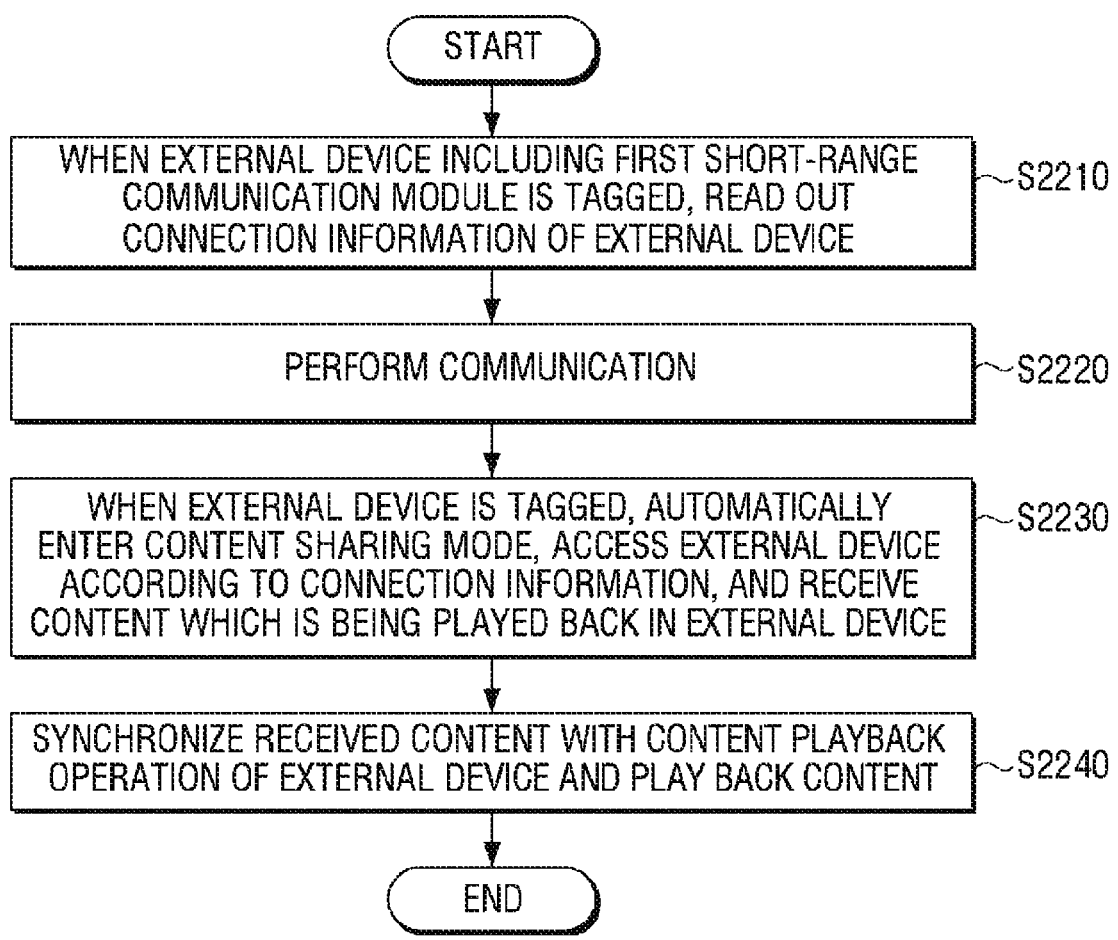
FIG. 22 is a flowchart illustrating a method for controlling of a terminal device according to another embodiment of the present disclosure.

FIG. 22 is a flowchart illustrating a method for controlling of a terminal device according to another embodiment of the present disclosure.

Referring to FIG. 22, when an external device including a first short-range communication module is tagged, the terminal device reads out connection information of the external device at operation S2210. The terminal device and the external device exchange the connection information for establishing communication with each other, and are connected to each other in various communication methods. For example, the communication methods include Blutooth, Zigbee, and Wi-Fi. The terminal device performs communication at operation S2220. The terminal device exchanges synchronization information for receiving, synchronizing and playing back the content with the external device.

When the terminal device is tagged in the external device, the terminal device automatically enters a content sharing mode, accesses the external device according to the connection information, and receives a content that is being played back in the external device at operation S2230. The terminal device may be in a standby state or may execute an application prior to sharing the content. The content sharing mode may be a program that is embedded in the terminal device or an application that is downloaded and installed. The content sharing mode is a mode in which information necessary for sharing a content is exchanged and synchronization is performed, and a real content may be played back using a linked separate application. For example, the terminal device may play back a music content or a moving image content by additionally executing a music player application or a moving image player application. The terminal device synchronizes the received content with a content playback operation of the external device, and plays back the content at operation S2240.

That is, the terminal device plays back a content. The terminal device, when tagged with the external device when the content is played back, shares communication connection information and connects communication with the external device. When communication is connected, the terminal device transmits the synchronization signal and played back content to the external device.

The method for controlling of the terminal device according to various embodiments as described above may be implemented as a program and may be provided to a terminal device.

For example, a non-transitory computer readable medium, which stores a program performing playing back a content, when tagged with an external device while a content is played back, sharing communication connection information and connecting with the external device, and transmitting a synchronization signal and the played back content to the external device may be provided.

Also, a non-transitory computer readable medium, which stores a program performing: capturing a frame constituting a content and extracting a finger print, transmitting the finger print to a content recognition server and receiving object information matching the finger print, and displaying the received object information, may be provided.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a Compact Disc (CD), a Digital Versatile Disk (DVD), a hard disk, a Blue-ray disk, a USB, a memory card, and a ROM, and may be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A terminal device comprising, the device comprising:
a communicator configured to perform communication;
a short-range wireless communication module configured to:
  detect a tag of an external device, and
  share communication connection information with the tagged external device using a first communication technology;
a display;
at least one processor; and
at least one memory storing one or more computer programs configured to be executed by the at least one processor, the one or more computer programs including instructions to, if the tagging of the external device is detected while a content is played back:
  control the communicator to establish communication with the tagged external device based on the communication connection information,
  control the display to display a screen comprising a plurality of groups generated based on each of a plurality of portions of the content if the content comprises a plurality of portions,
  add the tagged external device to a group of the plurality of groups, and
  control the communicator to transmit one of the plurality of portions of the content and a synchronization signal to the tagged external device based on a characteristic of the group of the plurality of groups to which the external device is added,
wherein the one of the plurality of portions of the content and the synchronization signal are transmitted to the tagged external device using a second communication technology different from the first communication technology.

2. The device as claimed in claim 1, wherein the synchronization signal comprises a signal to synchronize the tagged external device and a content playback time on a real time basis.

3. The device as claimed in claim 1, wherein the one or more computer programs further include instructions to, if communication is established with the tagged external device while the content is played back in the multimedia part, control the communicator to transmit the one of the plurality of portions of the content by a streaming method.

4. The device as claimed in claim 1, wherein the one or more computer programs further include instructions to control to display a group control screen including a control menu to adjust an output state of the content on the display.

5. The device as claimed in claim 4, wherein the one or more computer programs further include instructions to:
  if an adjustment command for one of the plurality of groups is input, transmit the adjustment command to each external device belonging to the one of the plurality of groups, and
  simultaneously adjust a content output state of each external device belonging to the one of the plurality of groups.

6. A terminal device, the device comprising:
a communicator configured to perform communication;
a short-range wireless communication module configured to:
  detect a tag of an external device, and
  share communication connection information with the tagged external device using a first communication technology;
a display;
at least one processor; and
at least one memory storing one or more computer programs configured to be executed by the at least one processor, the one or more computer programs including instructions to:
  if the tagging of the external device is detected while a content is played back, control the communicator to establish communication with the tagged external device using a second communication technology different from the first communication technology based on the communication connection information,
  control the display to display a screen comprising a plurality of groups generated based on each of a plurality of channel sounds of the content if the content comprises a plurality of channel sounds,
  add the tagged external device to a group of the plurality of groups,
  process preset channel sound from among the plurality of channel sounds,
  generate a synchronization signal and an audio signal of one of the plurality of channel sounds of the content based on the processed preset channel sound and a characteristic of the plurality of groups to which the external device is added, and
  control the communicator to transmit the synchronization signal and the audio signal to the tagged external device using the second communication technology.

7. The device as claimed in claim 6, wherein the one or more computer programs further include instructions to:
  control to classify the audio signal into the plurality of channel sounds, and
  control the communicator to transmit the preset channel sound from among the classified plurality of channel sounds to the tagged external device.

8. The device as claimed in claim 7, wherein the plurality of channel sounds comprise at least one of a front left channel sound, a front right channel sound, a rear left channel sound, a rear right channel sound, a center channel sound, a low frequency effects channel sound.

9. The device as claimed in claim 6, wherein the one or more computer programs further include instructions to:
  control the communicator to transmit channel sound information which designates channel sound to be output at the tagged external device, from among the plurality of channel sounds of the content, and
  control the communicator to transmit the designate channel sound to the tagged external device,
  wherein each of the plurality of channel sounds is output to a different external device of the plurality of external devices.

10. A method for controlling a terminal device, the method comprising:
playing back content including a plurality of portions;
if a tagging defined as movement of an external device to a communication allowable range is detected, sharing communication connection information and connecting with the tagged external device using a first communication technology;
displaying a screen comprising a plurality of groups generated based on each of a plurality of portions of the content if the content comprises a plurality of portions;
adding the tagged external device to a group of the plurality of groups; and
transmitting one of the plurality of portions of the content and a synchronization signal to the tagged external device based on a characteristic of the group of the plurality of groups to which the external device is added using a second communication technology different from the first communication technology.

11. The method as claimed in claim 10, wherein the synchronization signal comprises a signal to synchronize the tagged external device and a content playback time on a real time basis.

12. The method as claimed in claim 10, wherein the transmitting of the one of the plurality of portions of the content and the synchronization signal comprises, if communication is established with the tagged external device while the content is played back, transmitting the one of the plurality of portions of the content by a streaming method.

13. The method as claimed in claim 10, further comprising:
displaying a group control screen including a control menu to adjust an output state of the content.

14. The method as claimed in claim 13, further comprising:
if an adjustment command for one of the plurality of groups is input, transmitting the adjustment command to each external device belonging to one of the plurality of groups and simultaneously adjusting a content output state of each external device belonging to the one of the plurality of groups.

15. A method for controlling of a terminal device, the method comprising;
playing back content including a plurality of channel sounds;
if a tagging defined as a movement of an external device to a communication allowable range is detected, sharing communication connection information and connecting with the tagged external device using a first communication technology;
displaying a screen comprising a plurality of groups generated based on each of a plurality of channel sounds of the content if the content comprises a plurality of portions;
adding the tagged external device to a group of the plurality of groups;
processing information associated with a preset channel sound from among the plurality of channel sounds;
generating a synchronization signal and an audio signal of one of the plurality of channel sounds of the content to be output at the tagged external device based on the information associated with the preset channel sound and a characteristic of the plurality of groups to which the external device is added; and
transmitting, using a second communication technology different from the first communication technology, the synchronization signal and the audio signal of the content to be output at the tagged external device.

16. The method as claimed in claim 15,
wherein the processing of the information associated with the preset channel sound comprises classifying the audio signal into the plurality of channel sounds, and wherein the synchronization signal and the audio signal of one of the plurality of channel sounds of the content are generated for each of the classified channel sounds for each corresponding tagged external device.

17. The method as claimed in claim 16, wherein the plurality of channel sounds comprise at least one of a front left channel sound, a front right channel sound, a rear left channel sound, a rear right channel sound, a center channel sound, a low frequency effects channel sound.

18. The method as claimed in claim 15,
wherein the processing of the information associated with the preset channel sound comprises identifying sound information which designates channel sound to be output at the tagged external device from among the plurality of channel sounds, and
wherein the audio signal comprises each of the plurality of channel sounds to be output at the tagged external device.

* * * * *